US012762720B2

(12) United States Patent
Nozaki et al.

(10) Patent No.: US 12,762,720 B2
(45) Date of Patent: Oct. 13, 2026

(54) DATA CONVERSION DEVICE, MOVING IMAGE CONVERSION SYSTEM, DATA CONVERSION METHOD, AND RECORDING MEDIUM

(71) Applicant: NEC Corporation, Tokyo (JP)

(72) Inventors: Yoshitaka Nozaki, Tokyo (JP); Kenichiro Fukushi, Tokyo (JP); Kosuke Nishihara, Tokyo (JP); Kentaro Nakahara, Tokyo (JP)

(73) Assignee: NEC CORPORATION, Tokyo (JP)

(*) Notice: Subject to any disclaimer, the term of this patent is extended or adjusted under 35 U.S.C. 154(b) by 296 days.

(21) Appl. No.: 18/380,384

(22) Filed: Oct. 16, 2023

(65) Prior Publication Data

US 2024/0144500 A1 May 2, 2024

(30) Foreign Application Priority Data

Nov. 2, 2022 (JP) ................................ 2022-175959

(51) Int. Cl.
*G06T 7/33* (2017.01)
*G06T 7/246* (2017.01)
(Continued)

(52) U.S. Cl.
CPC .............. *G06T 7/337* (2017.01); *G06T 7/248* (2017.01); *G06T 7/74* (2017.01);
(Continued)

(58) Field of Classification Search
CPC ........... G06T 7/337; G06T 7/248; G06T 7/74; G06T 2207/10016; G06T 2207/20081;
(Continued)

(56) References Cited

U.S. PATENT DOCUMENTS

2015/0325270 A1* 11/2015 Utsunomiya .......... G16H 30/20
386/230
2018/0176423 A1* 6/2018 Bazin ..................... G06V 20/48
2022/0284220 A1 9/2022 Wu et al.

FOREIGN PATENT DOCUMENTS

JP 2010-033163 A 2/2010
JP 2020-155961 A 9/2020
(Continued)

OTHER PUBLICATIONS

Jalata, I. K., Truong, T.-D., Allen, J. L., Seo, H.-S., & Luu, K. (2021). Movement analysis for neurological and musculoskeletal disorders using graph convolutional neural network. Future Internet, 13(8), 194. https://doi.org/10.3390/fi13080194 (Year: 2021).*
(Continued)

*Primary Examiner* — John Villecco
*Assistant Examiner* — Kyla Guan-Ping Tiao Allen
(74) *Attorney, Agent, or Firm* — Sughrue Mion, PLLC

(57) ABSTRACT

A data conversion device including a feature amount calculation unit that normalizes posture data estimated in each frame constituting moving image data including a synchronization target motion into an angular representation, and calculates a feature amount in an embedded space by inputting the posture data normalized into the angular representation to an encoder, a distance calculation unit that calculates a distance between a feature amount calculated in each frame constituting reference moving image data and a feature amount calculated in each frame constituting synchronization target moving image data, a synchronization processing unit that calculates an optimal path for each frame based on the calculated distance and synchronizes the synchronization target moving image data with the reference moving image data by aligning timings of frames connected by the optimal path, and an output unit that outputs the
(Continued)

synchronization target moving image data synchronized with the reference moving image data.

7 Claims, 17 Drawing Sheets

(51) Int. Cl.
*G06T 7/38* (2017.01)
*G06T 7/73* (2017.01)
*G06V 10/62* (2022.01)
*G06V 40/20* (2022.01)

(52) U.S. Cl.
CPC ............... *G06T 2207/10016* (2013.01); *G06T 2207/20081* (2013.01); *G06T 2207/20084* (2013.01); *G06T 2207/30196* (2013.01)

(58) Field of Classification Search
CPC . G06T 2207/20084; G06T 2207/30196; G06T 7/344; G06T 7/38; G06V 10/62; G06V 10/82; G06V 40/23
See application file for complete search history.

(56) References Cited

FOREIGN PATENT DOCUMENTS

| | | |
|---|---|---|
| JP | 2021-139899 A | 9/2021 |
| JP | 2022-072444 A | 5/2022 |

OTHER PUBLICATIONS

Plizzari, C., Cannici, M., & Matteucci, M. (2021). Skeleton-based action recognition via spatial and temporal transformer networks. Computer Vision and Image Understanding, 208-209, 103219. https://doi.org/10.1016/j.cviu.2021.103219 (Year: 2021).*

Switonski, A., Josinski, H., & Wojciechowski, K. (2012). Dynamic time warping in classification and selection of Motion Capture Data. International Journal of Computer and Information Engineering, 6(11), 1289-1294. (Year: 2012).*

Holt, G. A., Reinders, M. J. T., & Hendriks, E. A. (2007). (PDF) multi-dimensional dynamic time warping for gesture recognition. Research Gate. https://www.researchgate.net/publication/228740947_Multi-dimensional_dynamic_time_warping_for_gesture_recognition (Year: 2007).*

S. Sempena, Nur Ulfa Maulidevi and Peb Ruswono Aryan, "Human action recognition using Dynamic Time Warping," Proceedings of the 2011 International Conference on Electrical Engineering and Informatics, Bandung, Indonesia, 2011, pp. 1-5, doi: 10.1109/ICEEI.2011.6021605. (Year: 2011).*

D. Dwibedi et al., "Temporal Cycle-Consistency Learning", IEEE Conf. on Computer Vision and Pattern Recognition (2019), pp. 1801-1810.

Japanese Office Action for JP Application No. 2022-175959, mailed on Jun. 30, 2026 with English Translation.

Noboru Yoshida et al., "Person Video Retrieval Focusing on Posture Similarity," IEICE Technical Report, Japan, The Institute of Electronics, Information and Communication Engineers, Oct. 2, 2020, vol. 120, No. 187, pp. 32-37.

* cited by examiner

DATA CONVERSION DEVICE, MOVING IMAGE CONVERSION SYSTEM, DATA CONVERSION METHOD, AND RECORDING MEDIUM

This application is based upon and claims the benefit of priority from Japanese Patent Application No. 2022-175959, filed on Nov. 2, 2022, the disclosure of which is incorporated herein in its entirety by reference.

TECHNICAL FIELD

The present disclosure relates to a data conversion device that synchronizes motion data and others.

BACKGROUND ART

Extending motion data using a digital twin technique related to human motion makes it possible to construct a motion recognition model using a smaller amount of actual measurement data than general learning, with an accuracy equal to or higher than that in the case of using a large amount of data. In order to stabilize learning of a Generative Adversarial Network (GAN) used in data extension, it is important to effectively normalize data. For example, if motions included in motion data in common with different motion data are normalized, the learning of the generative adversarial model can be stabilized. That is, if the common motions included in the motion data can be synchronized between the different motion data, the learning of the generative adversarial model can be stabilized.

NPL 1 (D. Dwibedi, et al., "Temporal Cycle-Consistency Learning", IEEE Conf. on Computer Vision and Pattern Recognition (2019)) discloses a self-supervised representation learning method based on tasks of temporal matching between moving images. According to the method in NPL 1, a network is trained using temporal cycle-consistency (TCC). According to the method in NPL 1, common operations included in different moving images are synchronized by associating the nearest frames in the learned embedded space.

PTL 1 (JP 2010-033163 A) discloses a motion data search device that searches for motion data based on a given search condition. The device in PTL 1 calculates a section feature amount representing a feature of motion in motion data representing a series of motions of an object in each section of a certain time. The device in PTL 1 calculates the distance between the section feature amount in search condition motion data and the section feature amount in search target motion data. The device in PTL 1 generates presentation data of a search result based on the calculated distance.

PTL 2 (JP 2022-072444 A) discloses a behavior recognition learning device that learns parameters of a behavior recognition model. The device in PTL 2 accepts, as learning data, motion data including motions of an operation target and behavior labels corresponding to the behavior types of the motions. The device in PTL 2 clusters the behavior labels based on similarity in motion, and generates a hierarchical structure of behavior labels. The device in PTL 2 learns parameters of a behavior recognition model based on loss calculated using the motion data and the hierarchical structure. According to the method in PTL 2, a triaxial acceleration sensor and a triaxial angular velocity sensor attached to a lower limb portion of a human body are used to calculate an angle formed by an acceleration vector of a joint at the time of heel grounding with respect to a motion trajectory (corresponding to the angle of knees), as a walking parameter. However, according to PTL 2, it is not possible to generate information with which the behavior of the knees in the horizontal direction can be grasped.

According to the method in NPL 1, an encoder model is trained with moving image data, and the two pieces of moving image data are synchronized by associating the nearest frames in the embedded space. According to the method in NPL 1, the background included in the moving image affects the synchronization of the two pieces of moving image data. Therefore, according to the method in NPL 1, the accuracy of synchronization may decrease in a case where the background is greatly different in different moving images. In addition, the method in NPL 1 is not applicable to data that is not in the form of a moving image.

According to the method in PTL 1, motion data stored in advance in a database is searched for in accordance with diversity of motion. According to the method in PTL 1, it is not assumed that motion data is extracted using moving image data. Therefore, according to the method in PTL 1, it is not always possible to similarly extract the same motion from moving image data having different backgrounds.

According to the method in PTL 2, the parameters of the behavior recognition model are learned using motion data and behavior labels as learning data. PTL 2 does not disclose a specific method for extracting motion data from moving image data. Therefore, according to the method in PTL 2, it is not always possible to similarly extract the same motion from moving image data having different backgrounds.

An object of the present disclosure is to provide a data conversion device that is capable of synchronizing synchronization target motions included in a plurality of pieces of moving image data with high accuracy without being affected by a background, and others.

SUMMARY

A data conversion device according to an aspect of the present disclosure includes a feature amount calculation unit that normalizes posture data estimated in each frame constituting moving image data including a synchronization target motion into an angular representation, and calculates a feature amount in an embedded space by inputting the posture data normalized into the angular representation to an encoder including a graph convolutional network, a distance calculation unit that calculates a distance between a feature amount calculated in each frame constituting reference moving image data and a feature amount calculated in each frame constituting synchronization target moving image data, a synchronization processing unit that calculates an optimal path for each frame based on the calculated distance and synchronizes the synchronization target moving image data with the reference moving image data by aligning timings of frames connected by the optimal path, and an output unit that outputs the synchronization target moving image data synchronized with the reference moving image data.

A data conversion method according to an aspect of the present disclosure includes normalizing posture data estimated in each frame constituting moving image data including a synchronization target motion into an angular representation, inputting the posture data normalized into the angular representation to an encoder including a graph convolutional network to calculate a feature amount in an embedded space, calculating a distance between a feature amount calculated in each frame constituting the reference moving image data and a feature amount calculated in each frame constituting the synchronization target moving image data, calculating an optimal path for each frame based on the calculated distance, synchronizing the synchronization target moving image data with the reference moving image data by aligning timings of frames connected by the optimal path, and outputting the synchronization target moving image data synchronized with the reference moving image data.

A program according to an aspect of the present disclosure causes a computer to execute normalizing posture data estimated in each frame constituting moving image data including a synchronization target motion into an angular representation, inputting the posture data normalized into the angular representation to an encoder including a graph convolutional network and calculating a feature amount in an embedded space, calculating a distance between a feature amount calculated in each frame constituting the reference moving image data and a feature amount calculated in each frame constituting the synchronization target moving image data, calculating an optimal path for each frame based on the calculated distance, synchronizing the synchronization target moving image data with the reference moving image data by aligning timings of frames connected by the optimal path, and outputting the synchronization target moving image data synchronized with the reference moving image data.

BRIEF DESCRIPTION OF THE DRAWINGS

Exemplary features and advantages of the present invention will become apparent from the following detailed description when taken with the accompanying drawings in which.

EXAMPLE EMBODIMENT

Figure 1:
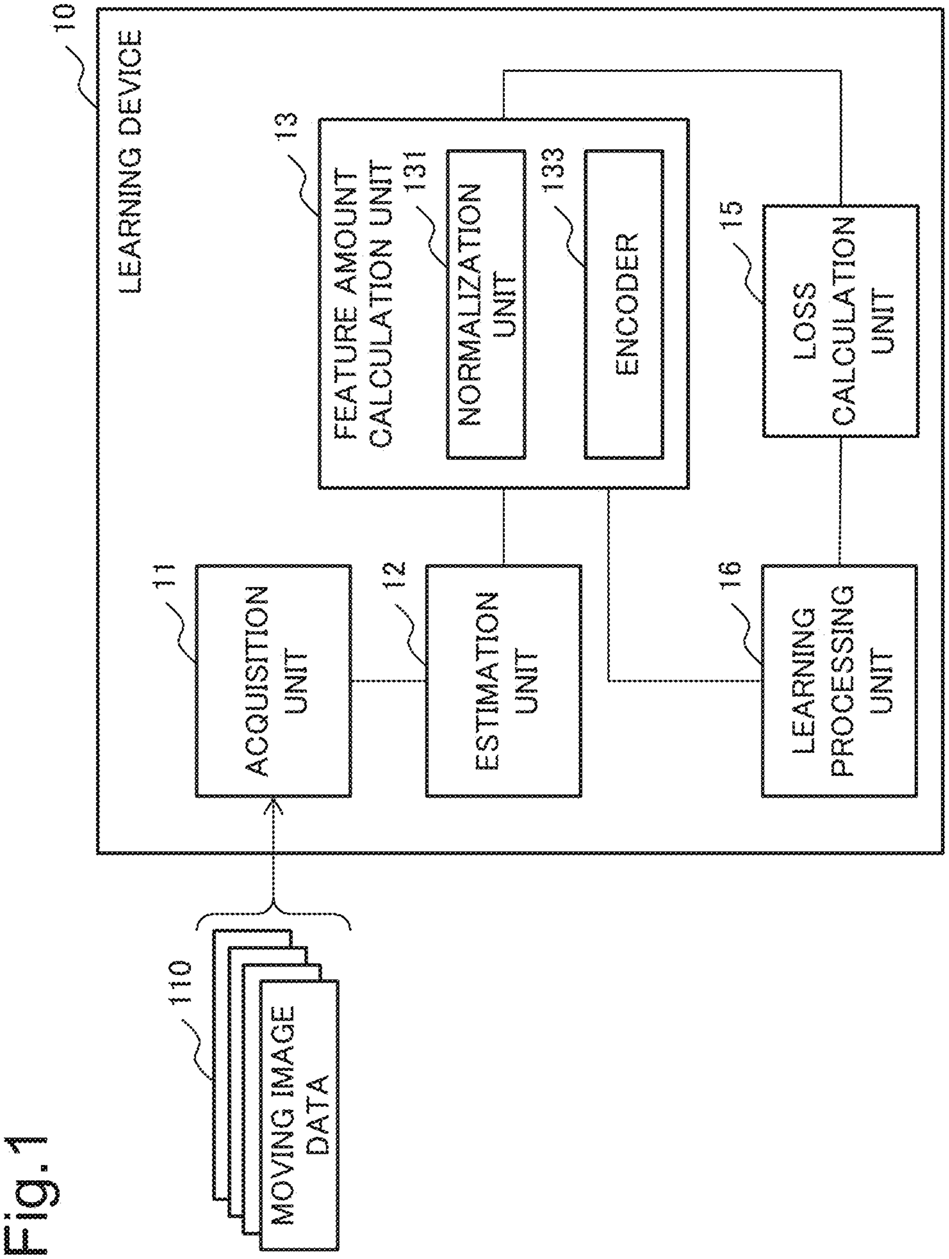
FIG. 1 is a block diagram illustrating an example of a configuration of a learning device according to a first example embodiment.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, a learning device according to a first example embodiment will be described with reference to the drawings. The learning device according to the present example embodiment effects learning of an encoder that synchronizes the same motions included in different moving image data. The moving image data includes a plurality of frames. Data regarding the posture of a person extracted from each frame will be called posture data. Data in which a plurality of pieces of posture data is connected in time series will be called motion data. In the following description, synchronizing the same motions included in different moving image data may be expressed as synchronizing different moving image data.

The present example embodiment is described partially based on the method disclosed in Non-Patent Document 1 (NPL 1: D. Dwibedi, et al., "Temporal Cycle-Consistency Learning", IEEE Conf. on Computer Vision and Pattern Recognition (2019)).

(Configuration)

FIG. 1 is a block diagram illustrating an example of a configuration of a learning device 10 according to the present example embodiment. The learning device 10 includes an acquisition unit 11, an estimation unit 12, a feature amount calculation unit 13, a loss calculation unit 15, and a learning processing unit 16.

The acquisition unit 11 acquires moving image data 110. The moving image data 110 is data including an image of a person who performs a learning target motion. For example, the learning target motion includes motions such as backlash, jumping, walking, running, and stretching. The type of the learning target motion is not particularly limited as long as it can be extracted from the frames constituting the moving image data.

For example, the acquisition unit 11 may acquire posture data of a person extracted from the moving image data. The posture data is a data set of position coordinates regarding the positions of representative body parts of a person. For example, the representative body parts of a person are a joint, an end, and the like. For example, the acquisition unit 11 may acquire posture data measured using motion capture. If the acquisition unit 11 directly acquires the posture data, the estimation unit 12 can be omitted.

The estimation unit 12 extracts a person from the frames included in the moving image data 110. The estimation unit 12 estimates the posture data of the extracted person. For example, the estimation unit 12 estimates the posture data of a person extracted from the moving image data 110 using a deep learning model. The estimation unit 12 estimates spatial positions of representative body parts of a person extracted from the moving image data 110 as the posture data. In other words, the posture data is data regarding the posture of the person extracted from the moving image data 110.

Figure 2:
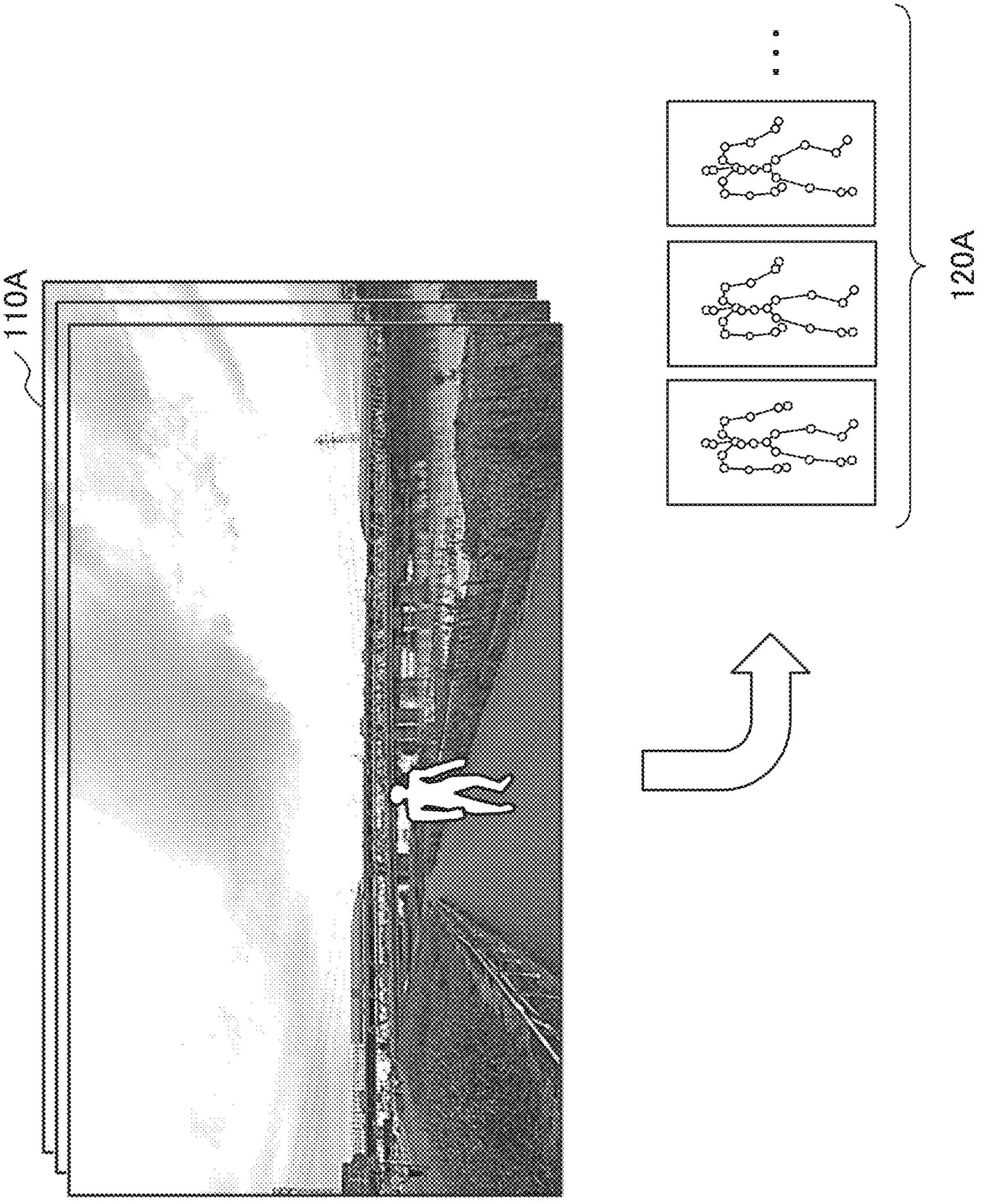
FIG. 2 is a conceptual diagram illustrating an example of extracting posture data from moving image data to be learned by the learning device according to the first example embodiment.

FIG. 2 is a conceptual diagram illustrating an example of posture data (posture data 120A) extracted from moving image data 120A. FIG. 2 illustrates an example of the moving image data 110A including a person who performs a learning target motion. FIG. 2 illustrates some of frames constituting the moving image data 110A. The estimation unit 12 estimates the position of representative body parts (joints) of the person as the posture data 110A from the frames included in the moving image data 120A. In each frame, circles indicating the positions of representative body parts (joints) of the person are connected by connection lines. For example, the estimation unit 12 estimates position coordinates of joints of the shoulders, elbows, wrists, neck, chest, waist, crotch, knees, and ankles as the posture data. For example, the estimation unit 12 estimates position coordinates of terminal parts such as the head, fingertips, and toes as the posture data. For example, the estimation unit 12 estimates position coordinates of body parts between joints or terminal parts as the posture data. Hereinafter, the positions of the representative body parts of a person will be expressed as joints.

Figure 3:
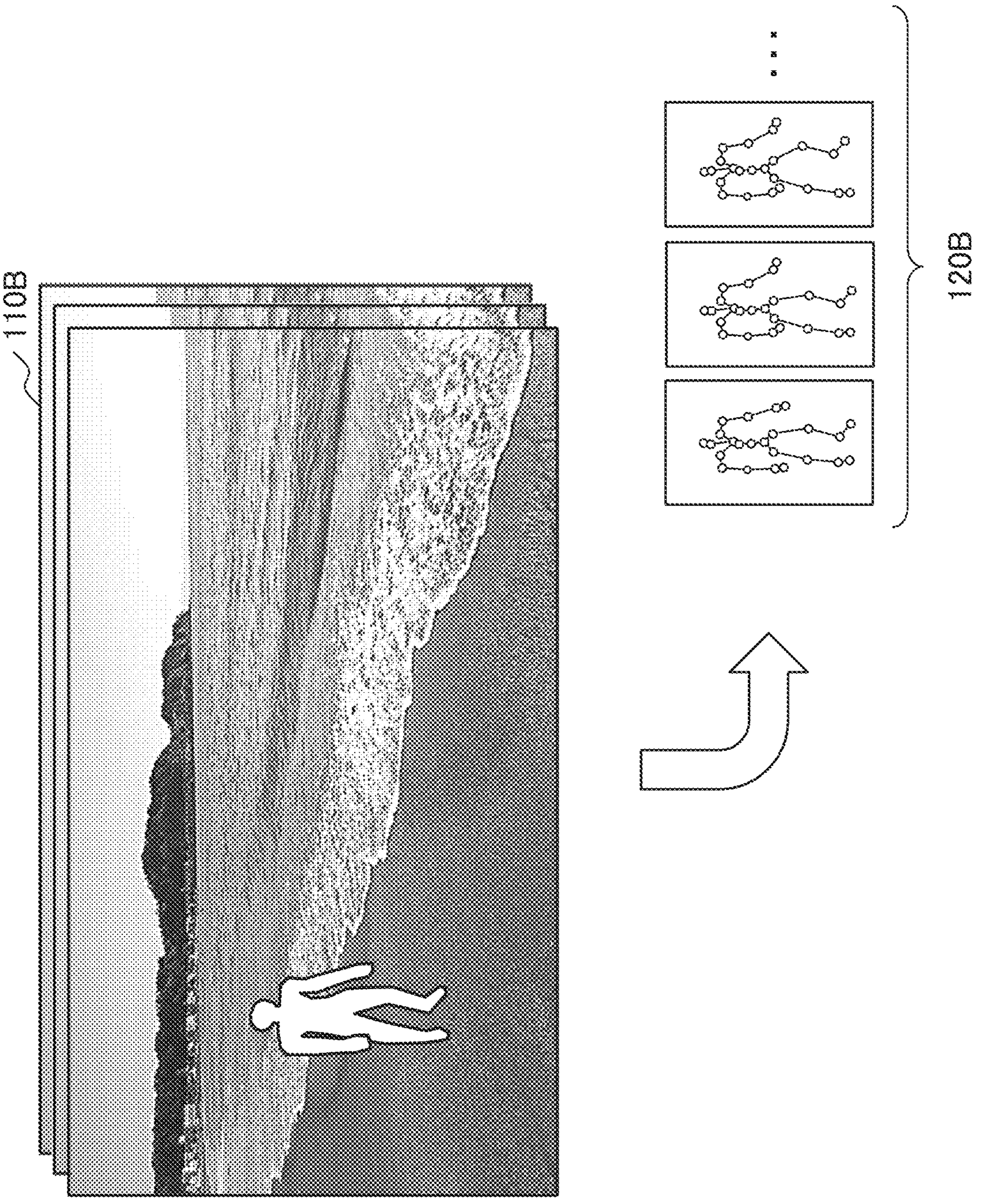
FIG. 3 is a conceptual diagram illustrating an example of extracting posture data from moving image data to be learned by the learning device according to the first example embodiment.

FIG. 3 is a conceptual diagram illustrating an example of posture data (posture data 120B) extracted from moving image data 110B. FIG. 3 illustrates an example of the moving image data 110B including a person who performs a learning target motion. FIG. 3 illustrates some of frames constituting the moving image data 110B. The estimation unit 12 estimates the position of representative body parts (joints) of the person as the posture data 110B from the frames included in the moving image data 120B. As in the example of FIG. 2, in each frame, circles indicating the positions of representative body parts (joints) of the person are connected by connection lines.

As illustrated in FIGS. 2 and 3, the moving image data 110A and the moving image data 110B include a person who performs the same learning target motion. The backgrounds of the moving image data 110A and the moving image data 110B are completely different. Therefore, when the feature amounts of the frames constituting the moving image data 110A and the moving image data 110B are calculated, the features include the background features. The estimation unit 12 estimates the posture data of the person in each of the frames constituting the moving image data 110A and the moving image data 110B. The features of the backgrounds included in the moving image data 110A and the moving image data 110B are excluded from the posture data estimated by the estimation unit 12. Therefore, the features of the backgrounds can be removed by using the posture data.

The feature amount calculation unit 13 includes a normalization unit 131 and an encoder 133. The feature amount calculation unit 13 uses the normalization unit 131 to normalize the posture data into an angular representation. The feature amount calculation unit 13 uses the encoder 133 to extract a feature amount related to the learning target motion from the posture data having been normalized into the angular representation.

The normalization unit 131 normalizes the posture data into an angular representation. The posture data of a person includes attributes related to a physique such as lengths of arms and legs of the person. On the other hand, the posture data of a person having been normalized into an angular representation does not include the attributes related to the physique of the person. The normalization unit 131 normalizes the posture data into an angular representation by calculating the angles formed by connection lines connecting the joints of the person.

Figure 4:
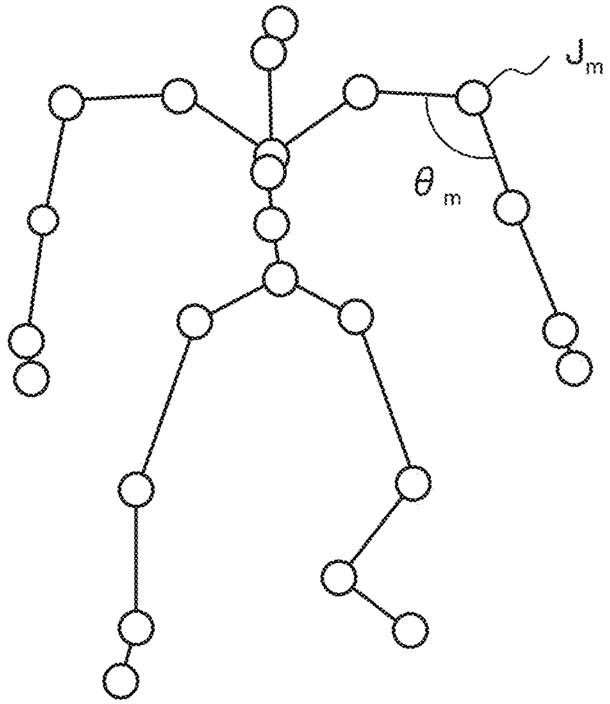
FIG. 4 is a conceptual diagram for describing an example of normalization of posture data into angular representation by the learning device according to the first example embodiment.

FIG. 4 is a conceptual diagram for describing an example of posture data having been normalized into an angular representation. The normalization unit 131 extracts joints $J_m$ for verifying the posture of the person from the posture data estimated in each frame (m is a natural number). The normalization unit 131 calculates a three-dimensional joint angle (Euler angle $\theta_m$) formed by two connection lines connecting the plurality of joints $J_m$. That is, the normalization unit 131 calculates a data set of Euler angles (joint angle data set) at the joints of the person extracted from each frame.

The encoder 133 includes a graph convolutional network (GCN). The encoder 133 learns a unique embedded representation for the frames included in the moving image data 110. For example, the encoder 133 performs feature extraction through learning by the temporal cycle-consistency (TCC) method disclosed in NPL 1. The TCC learning is self-supervised learning. According to the TCC learning, if there is a plurality of pieces of moving image data 110 including the same motions, the feature extractor can be trained without labels by calculating a loss function (Cycle-back Loss) that searches for a correspondence relationship between the plurality of pieces of moving image data 110.

The joint angle data set calculated by the normalization unit 131 is input to the encoder 133. The encoder 133 calculates a feature amount related to the input joint angle data set by the graph convolutional network. The encoder 133 converts the joint angle data set represented by a coordinate system in a three-dimensional space into an embedded representation. In this manner, the encoder 133 performs graph convolution, regarding adjacent joints represented in a skeleton form as a graph structure. The encoder 133 uses the graph convolutional network for the joint angle data set in a skeleton format that does not include the background in the moving image data 110. Therefore, the feature amount extracted using the encoder 133 is not affected by the background in the moving image data 110.

For example, the encoder 133 may output the feature amount according to an input of contexts in which a plurality of adjacent frames is combined. In that case, Spatio-Temporal (ST)-GCN is used as the encoder 133. Taking five consecutive frames with frame numbers 1 to 5 as an example, the frames with the frame numbers of 1 to 3, the frames with the frame numbers of 2 to 4, and the frames with the frame numbers 3 to 5 are combined and selected as contexts. In this way, it is preferable that the consecutive contexts preferably share the frames with the same frame numbers.

The loss calculation unit 15 calculates a loss using the feature amount calculated by the encoder 133. For example, the loss calculation unit 15 calculates the loss using the Cycle-back Loss method disclosed in D. Dwibedi, et al., "Temporal Cycle-Consistency Learning", IEEE Conf. on Computer Vision and Pattern Recognition (2019). The method of calculating loss by the loss calculation unit 15 is not limited.

In the case of using the method in NPL 1, the loss calculation unit 15 applies an encoder model based on Residual Network (ResNet) to two moving image data 110 (image sequences) including the same motion. As a result, a data string of the embedded representation (embedded data string) is obtained. For example, the loss calculation unit 15 applies an encoder model based on ResNet 50 including 50 layers of convolutional neural network (CNN) to moving image data S and moving image data T to obtain an embedded data string. The loss calculation unit 15 searches for the nearest embedding v among embeddings included in an embedded data sequence V of the moving image data T with respect to an embedding $u_i$ in the i-th frame of an embedded data sequence U of the moving image data S (i is a natural number). The loss calculation unit 15 searches for the nearest embedding $u_k$ in an embedded data sequence U of the moving image data S with respect to the searched embedding v (k is a natural number). The loss calculation unit 15 calculates a loss using the embedding $u_i$ and the embedding $u_k$. For example, the loss calculation unit 15 calculates a cross-entropy loss of matching between i and k as the loss. For example, the loss calculation unit 15 calculates a regression loss of the difference between i and k as the loss.

The learning processing unit 16 calculates a change amount (gradient) of the calculated loss. For example, the learning processing unit 16 calculates the gradient using the gradient descent method. The learning processing unit 16 trains the encoder 133 by machine learning according to the calculated gradient. The learning processing unit 16 trains the encoder 133 until the gradient becomes smaller than a preset reference. For example, the learning processing unit 16 trains the encoder 133 using stochastic gradient descent (SGD). The learning processing unit 16 may train the encoder 133 using a method other than the stochastic gradient descent SGD.

(Operation)

Figure 5:
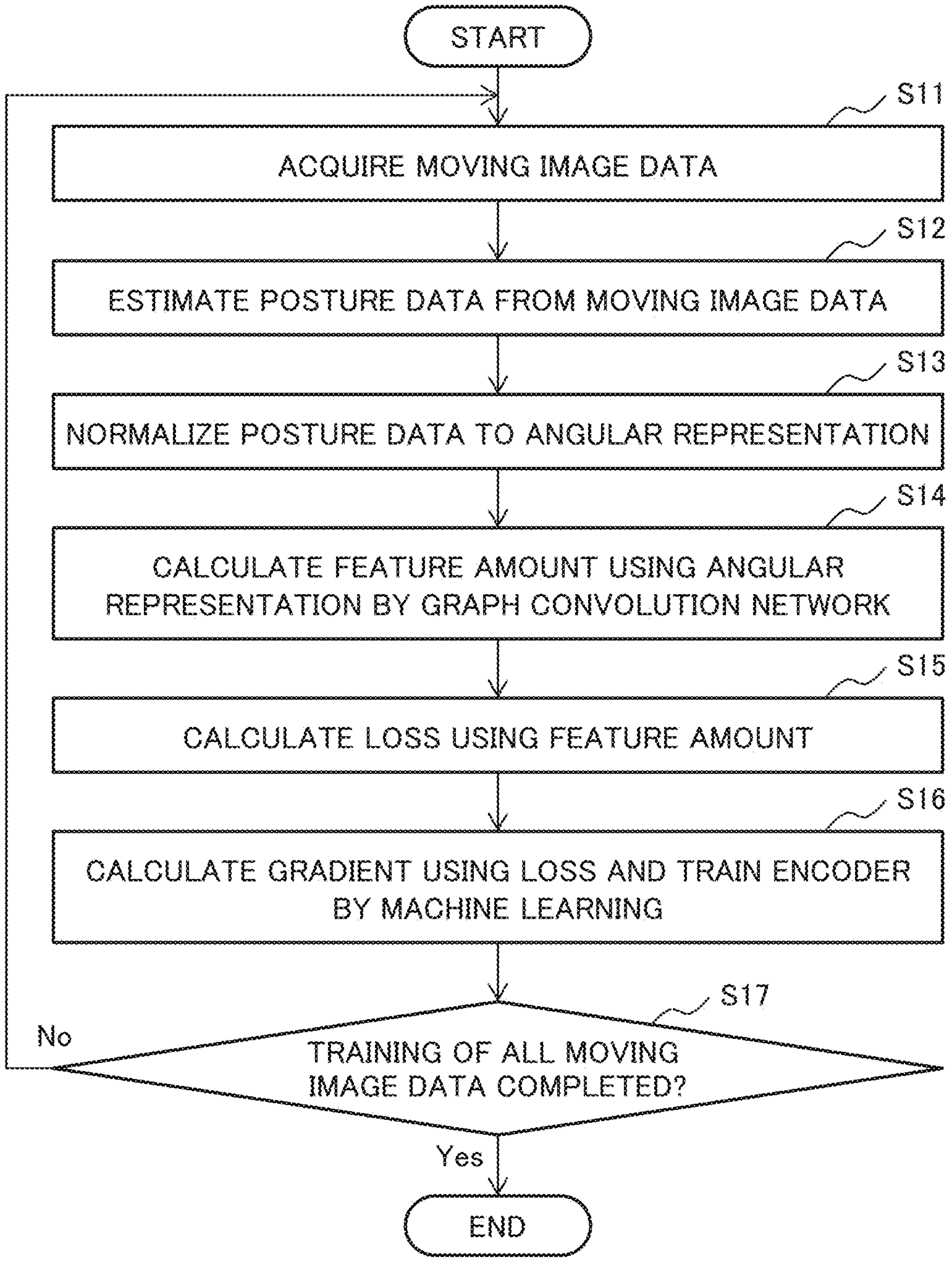
FIG. 5 is a flowchart for describing an example of operations of the learning device according to the first example embodiment.

Next, operations of the learning device 10 will be described with reference to the drawings. FIG. 5 is a flowchart for describing an example of operations of the learning device 10. The description along the flowchart in FIG. 5 is based on the assumption that the learning device 10 performs the operations.

Referring to FIG. 5, first, the learning device 10 acquires the moving image data 110 as a learning target (step S11).

The learning device 10 then estimates posture data in each frame constituting the moving image data 110 (step S12).

The learning device 10 then normalizes the posture data estimated in each frame included in the moving image data 110 into an angular representation (step S13).

The learning device 10 then calculates a feature amount related to the learning target motion from the posture data (joint angle data set) normalized into the angular representation, by a graph convolutional network (step S14).

The learning device 10 then calculates a loss using the calculated feature amount (step S15).

The learning device 10 then calculates a gradient using the calculated loss and trains the encoder 133 by machine learning (step S16). If the training of all the moving image data is not completed (No in step S17), the process returns to step S11. If the training of all the moving image data is completed (Yes in step S17), the processing along the flowchart in FIG. 5 is ended.

As described above, the learning device according to the present example embodiment includes the acquisition unit, the estimation unit, the feature amount calculation unit, the loss calculation unit, and the learning processing unit. The acquisition unit acquires learning target moving image data. The estimation unit estimates posture data from the learning target moving image data. The feature amount calculation unit has the encoder including the graph convolutional network. The feature amount calculation unit normalizes posture data estimated in each frame constituting moving image data including the learning target motion into an angular representation. The feature amount calculation unit inputs the posture data normalized into the angular representation to the encoder and calculates the feature amount in the embedded space. The loss calculation unit calculates a loss according to the feature amount calculated by the encoder. The learning processing unit trains the encoder based on the calculated loss gradient.

The learning device of the present example embodiment trains the encoder based on the loss according to the feature amount related to the posture data estimated in each frame constituting the learning target moving image data. The posture data is normalized into an angular representation. In addition, the feature amount is calculated in the embedded space. Therefore, according to the present example embodiment, the encoder can be trained in such a way that the motions included in the synchronization target moving image data can be synchronized with high accuracy without being affected by the background. Using the encoder trained by the learning device of the present example embodiment makes it possible to extend moving image data even without annotations such as tags and metadata. Using this encoder makes it possible to extend moving image data including various motions of humans in which motion timings and speeds in motion data are unified. The encoder trained by the learning device of the present example embodiment can be used for data conversion in synchronizing the synchronization target motions included in a plurality of pieces of moving image data.

Second Example Embodiment

Next, a data conversion device according to a second example embodiment will be described with reference to the drawings. The data conversion device of the present exemplary embodiment synchronizes synchronization target moving image data with reference moving image data using an encoder trained by the method of the first exemplary embodiment.

(Configuration)

Figure 6:
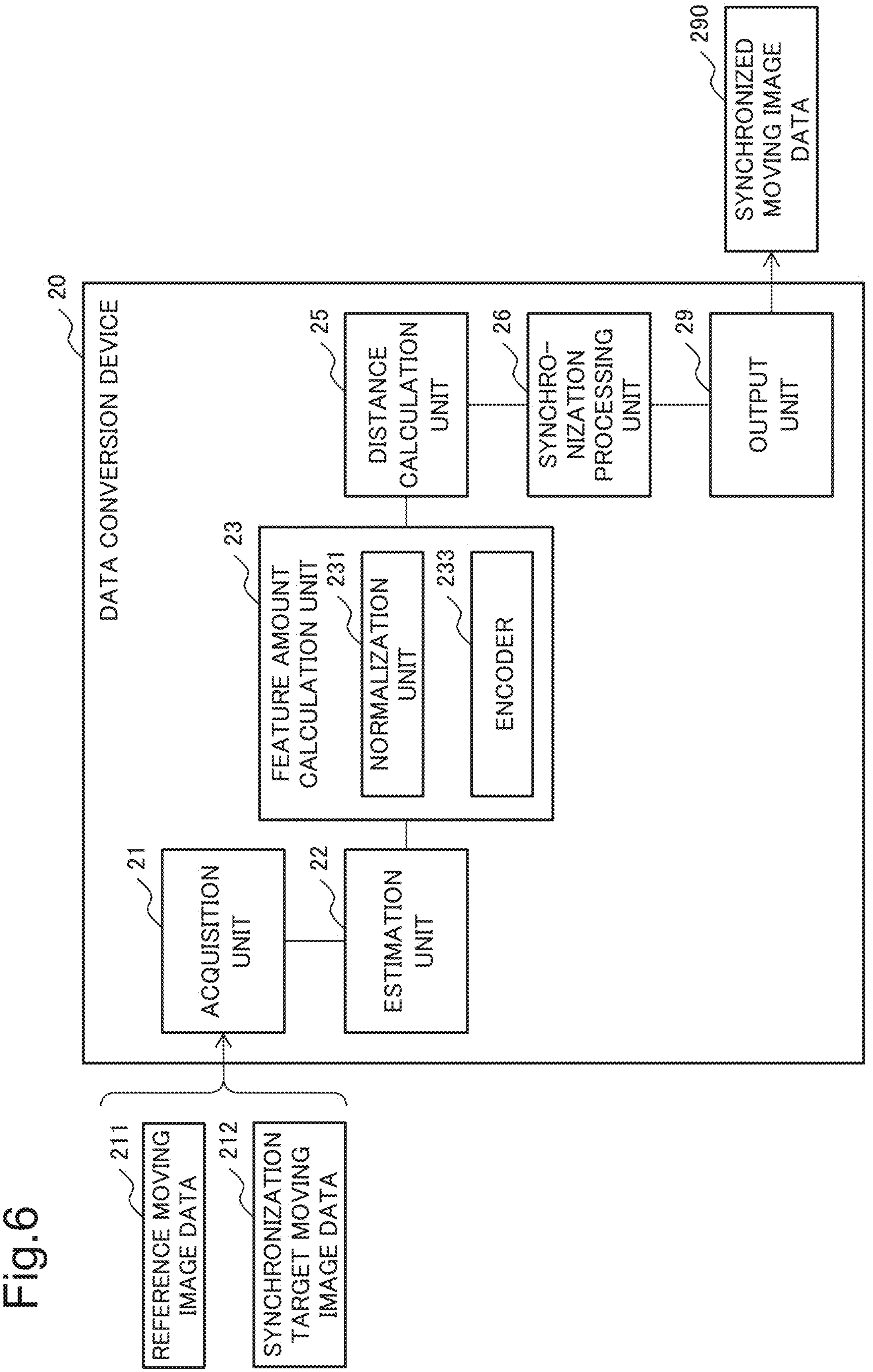
FIG. 6 is a block diagram illustrating an example of a configuration of a data conversion device according to a second example embodiment.

FIG. 6 is a block diagram illustrating an example of a configuration of a data conversion device 20 according to the present example embodiment. The data conversion device 20 includes an acquisition unit 21, an estimation unit 22, a feature amount calculation unit 23, a distance calculation unit 25, a synchronization processing unit 26, and an output unit 29.

The acquisition unit 21 acquires reference moving image data 211 and synchronization target moving image data 212. The reference moving image data 211 and the synchronization target moving image data 212 include a common synchronization target motion. The reference moving image data 211 is data serving as a reference of synchronization. The synchronization target moving image data 212 is data to be synchronized with the reference moving image data 211. The type of the synchronization target motion is not particularly limited as long as it can be extracted from the frames constituting the moving image data. For example, the synchronization target motion includes motions such as backlash, jumping, walking, running, and stretching.

The estimation unit 22 has the same configuration as the estimation unit 12 in the first example embodiment. The estimation unit 22 extracts a person from frames included in the reference moving image data 211 and the synchronization target moving image data 212. The estimation unit 22 estimates the posture data of the extracted person. For example, the estimation unit 22 estimates the posture data of the person extracted from the reference moving image data 211 and the synchronization target moving image data 212 by using a deep learning model. The estimation unit 22 estimates spatial positions of representative parts as the posture data of the person extracted from the reference moving image data 211 and the synchronization target moving image data 212.

The feature amount calculation unit 23 has the same configuration as the feature amount calculation unit 13 in the first example embodiment. The feature amount calculation unit 23 includes a normalization unit 231 and an encoder 233. The normalization unit 231 has the same configuration as the normalization unit 131 in the first example embodiment. The encoder 233 has the same configuration as the encoder 133 in the first example embodiment. The feature amount calculation unit 23 uses the normalization unit 231 to normalize the posture data into an angular representation. The feature amount calculation unit 23 uses the encoder 233 to extract feature amounts related to the synchronization target motion from the posture data having been normalized into the angular representation. The feature amount calculated using the joint angle data set in each frame constituting the reference moving image data 211 will be called first feature amount. The feature amount calculated using the joint angle data set in each frame constituting the synchronization target moving image data 212 will be called second feature amount.

The distance calculation unit 25 calculates a distance between the first feature amount related to the reference moving image data 211 and the second feature amount related to the synchronization target moving image data 212. That is, the distance calculation unit 25 calculates the distance between the feature amount calculated in each frame constituting the reference moving image data 211 and the feature amount calculated in each frame constituting the synchronization target moving image data 212. The distance calculation unit 25 calculates the distance in the embedded space. The distance calculation unit 25 calculates the distance (absolute value of error) between the first feature amount related to the reference moving image data 211 and the second feature amount related to the synchronization target moving image data 212 in a brute-force manner. For example, the distance calculation unit 25 calculates the distance between the feature amounts using a method such as L2 norm. According to this method, the distance (similarity) can be derived even if the length and period of the time-series data are different.

For example, the distance calculation unit 25 calculates the optimal path using a method such as dynamic time warping (DTW). According to the DTW, the distance (absolute value of error) between points constituting the two pieces of time-series data is calculated in a brute-force manner. Among all distances calculated between the feature amounts, the shortest distance corresponds to the optimal path. According to the DTW, even if the reference moving image data 211 and the synchronization target moving image data 212 are different in frame length and cycle, the similarity of the frames constituting the data can be calculated.

The synchronization processing unit 26 calculates the optimal path for each frame based on the distance calculated by the distance calculation unit 25. The synchronization processing unit 26 synchronizes the synchronization target moving image data with the reference moving image data by aligning the timings of the frames connected by the optimal path. The synchronization processing unit 26 synchronizes the synchronization target moving image with the reference moving image data, with reference to the synchronization target motion included in the reference moving image data. As a result, the most similar motions included in the reference moving image data 211 and the synchronization target moving image data 212 are associated with each other. The synchronization processing unit 26 then synchronizes the motions included in the reference moving image data 211 and the synchronization target moving image data 212 by aligning the timings of the frames including the associated motions.

Figure 7:
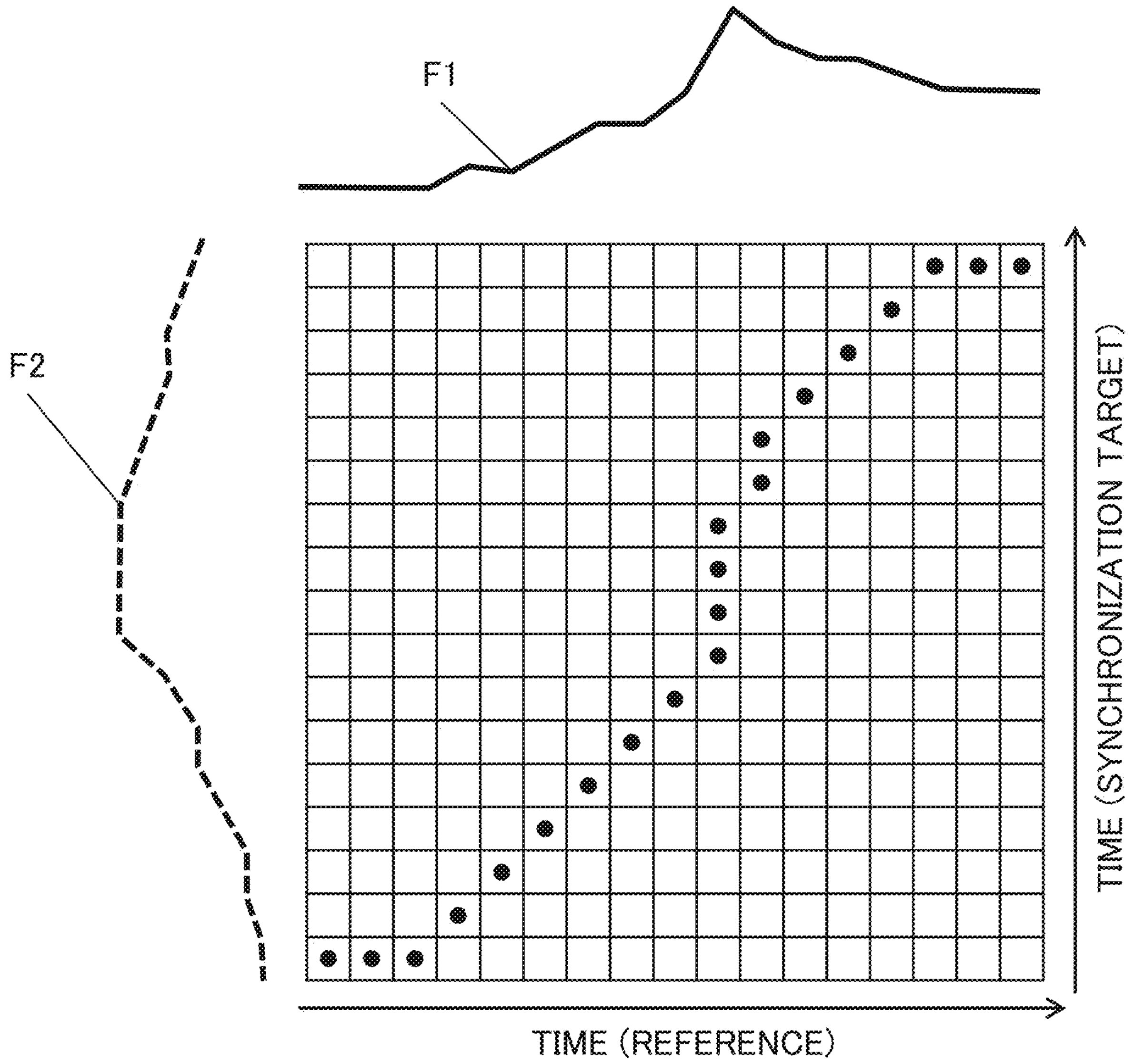
FIG. 7 is a conceptual diagram illustrating an example of a map in which optimal paths of feature amounts in frames constituting reference moving image data and synchronization target moving image data calculated by the data conversion device according to the second example embodiment are associated with each other.

FIG. 7 is a conceptual diagram illustrating an example of a map in which optimal paths of frames constituting the reference moving image data 211 and the synchronization target moving image data 212 are associated with each other. The time-series data (solid line) of the feature amount in each frame constituting the reference moving image data 211 is denoted as F1. The time-series data (broken line) of the feature amount in each frame constituting the synchronization target moving image data 212 is denoted as F2. In FIG. 7, the optimal paths are indicated by dots in squares arranged in an array. The frames constituting the reference moving image data 211 and the frames constituting the synchronization target moving image data 212 are associated with each other at the timing of the optimal paths (dots).

Figure 8:
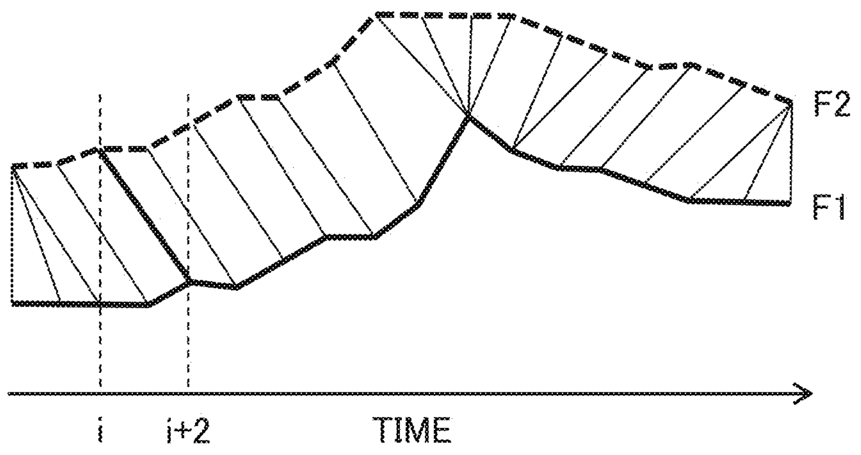
FIG. 8 is a graph illustrating a state in which the optimal paths of the frames constituting the reference moving image data and the synchronization target moving image data calculated by the data conversion device according to the second example embodiment are associated with each other.

FIG. 8 is a graph in which the optimal paths of frames constituting the reference moving image data 211 and the synchronization target moving image data 212 are associated with each other. FIG. 8 illustrates a state in which the optimal paths in frames are associated with each other by line segment. For example, time i of the time-series data F2 (broken line) and time i+2 of the time-series data F1 (solid line) are connected by the optimal path.

Figure 9:
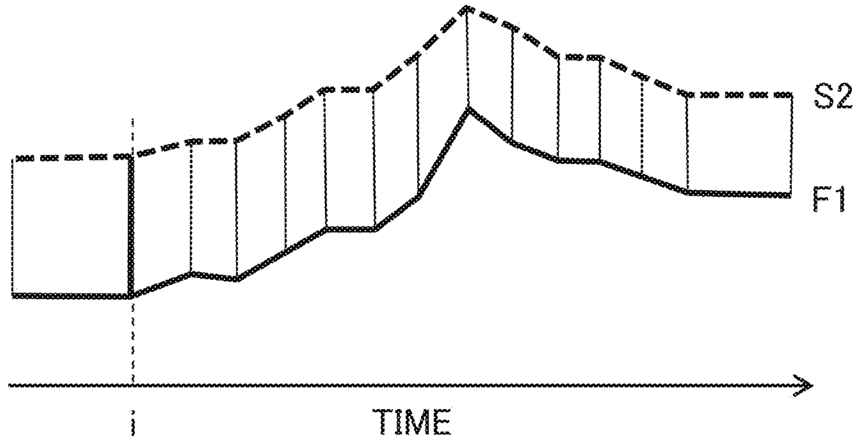
FIG. 9 is a graph illustrating a state in which timings of the optimal paths of the frames constituting the reference moving image data and the synchronization target moving image data calculated by the data conversion device according to the second example embodiment are aligned with each other.

FIG. 9 is a graph in which the time-series data F1 based on the reference moving image data 211 is associated with the time-series data S2 (broken line) of the feature amount in each frame constituting synchronized moving image data 290 that has been synchronized in accordance with the reference moving image data 211. As illustrated in FIG. 9, the synchronization target moving image data 212 is synchronized with the reference moving image data 211 by aligning the timings of the frames that are associated as the optimal path.

The output unit 29 outputs the synchronized moving image data 290. The synchronized moving image data 290 is used for learning of synchronization target motion (learning target motion). The synchronized moving image data 290 increases according to the number of pieces of synchronization target moving image data 212 to be processed. That is, the data conversion device 20 extends the moving image data including the learning target motion by increasing the synchronized moving image data 290 using the synchronization target moving image data 212.

The use application of the synchronized moving image data 290 output from the output unit 29 is not limited to the extension of the learning target motion. The synchronized moving image data 290 may be displayed on the screen of a terminal device that is viewable for the user who verifies the synchronization target motion. For example, the synchronized moving image data 290 may be displayed on the screen of a terminal device, side by side with the reference moving image data 211 that is synchronized with the synchronized moving image data 290. For example, the synchronized moving image data 290 may be displayed on the screen of a terminal device, side by side with the synchronization target moving image data 212 before synchronization.

(Operation)

Figure 10:
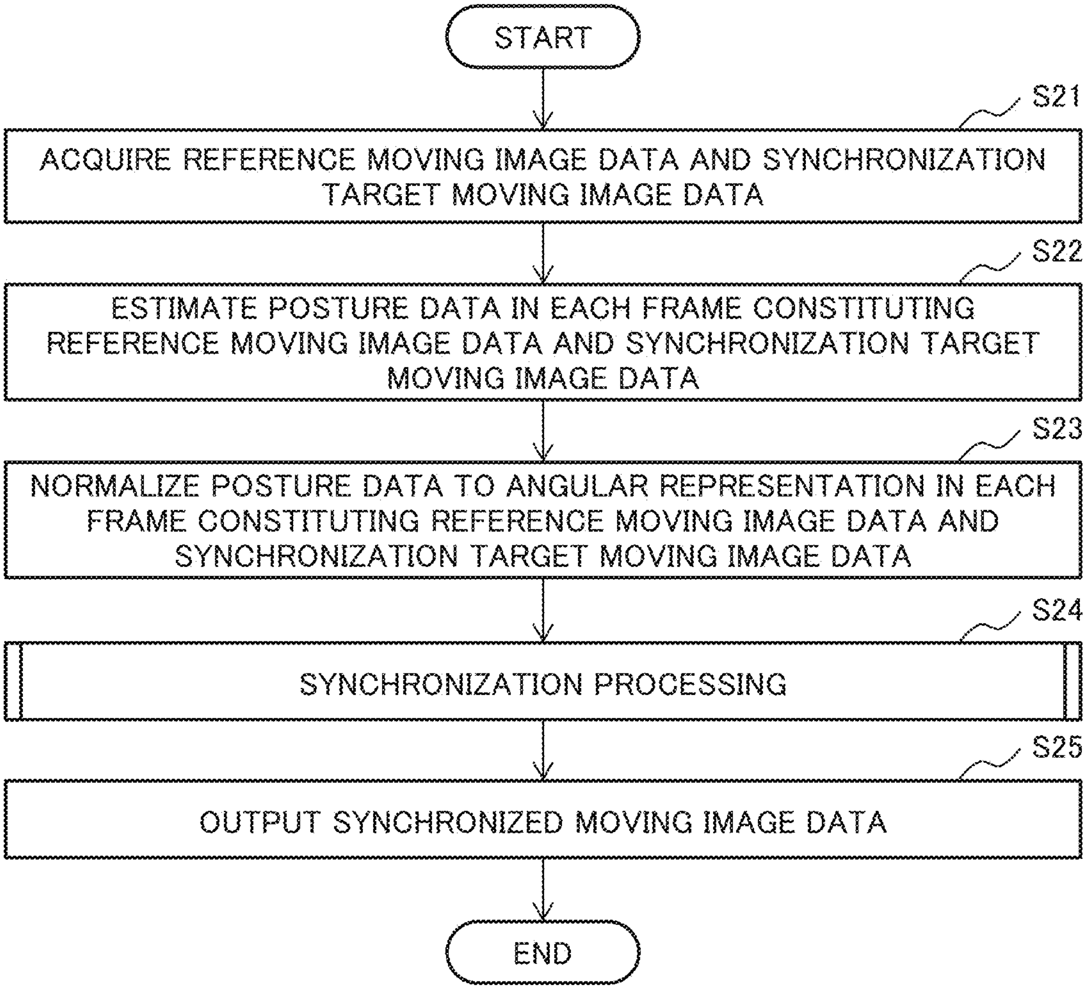
FIG. 10 is a flowchart for describing an example of operations of the data conversion device according to the second example embodiment.

Next, operations of the data conversion device 20 will be described with reference to the drawings. FIG. 10 is a flowchart for describing an example of operations of the data conversion device 20. The description along the flowchart in FIG. is based on the assumption that the data conversion device 20 performs the operations.

Referring to FIG. 10, first, the data conversion device 20 acquires the reference moving image data 211 and the synchronization target moving image data 212 (step S21).

Next, the data conversion device 20 estimates posture data in each frame constituting the reference moving image data 211 and the synchronization target moving image data 212 (step S22).

Next, the data conversion device 20 normalizes the posture data into angular representation in each frame constituting the reference moving image data 211 and the synchronization target moving image data 212 (step S23).

Next, the data conversion device 20 executes synchronization processing (step S24). In the synchronization processing in step S24, the data conversion device 20 uses the posture data normalized into the angular representation to synchronize the motion included in the synchronization target moving image data 212 with the motion included in the reference moving image data 211. Details of the synchronization processing in step S24 will be described later.

Next, the data conversion device 20 outputs the synchronized moving image data 290 synchronized in the synchronization processing (step S25). The output synchronized moving image data 290 is used for learning of the learning target motion. The output synchronized moving image data 290 may be displayed on the screen.

[Synchronization Processing]

Figure 11:
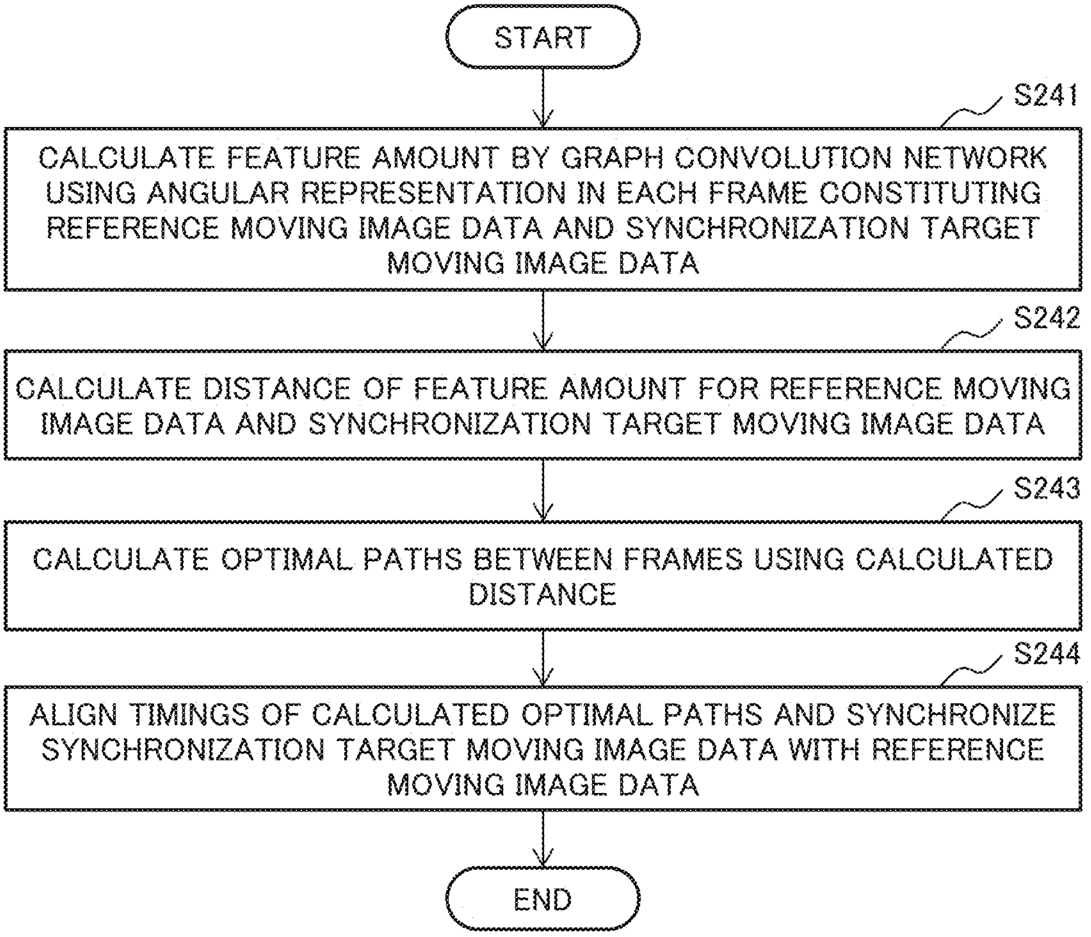
FIG. 11 is a flowchart for describing an example of synchronization processing by the data conversion device according to the second example embodiment.

Next, an example of synchronization processing (step S24 in FIG. 10) by the data conversion device 20 will be described with reference to the drawings. FIG. 11 is a flowchart for describing synchronization processing (step S24 in FIG. 10). The description along the flowchart in FIG. 11 is based on the assumption that the data conversion device 20 performs the operations.

Referring to FIG. 11, first, the data conversion device 20 calculates the feature amount by a graph convolutional network using the angular representation in each frame constituting the synchronization target moving image data 212 and the reference moving image data 211 (step S241).

Next, the data conversion device 20 calculates a distance of a feature amount related to the synchronization target moving image data and the reference moving image data (step S242).

The data conversion device 20 then calculates optimal paths between frames using the calculated distance (step S243).

The data conversion device 20 then synchronizes the synchronization target moving image data with the reference moving image data by aligning the timings of the calculated optimal paths (step S244). After step S244, the processing proceeds to step S25 in FIG. 10.

As described above, the data conversion device in the present example embodiment includes the acquisition unit, the estimation unit, the feature amount calculation unit, the distance calculation unit, the synchronization processing unit, and the output unit. The acquisition unit acquires the reference moving image data and the synchronization target moving image data. The estimation unit estimates posture data in each frame constituting each of the reference moving image data and the synchronization target moving image data. The feature amount calculation unit has the encoder including the graph convolutional network. For example, the encoder convolves posture data normalized into an angular representation by graph convolution, and outputs an embedding in an embedded space as a feature amount. The feature amount calculation unit normalizes posture data estimated in each frame constituting moving image data including the synchronization target motion into an angular representation. The feature amount calculation unit inputs the posture data normalized into the angular representation to the encoder and calculates the feature amount in the embedded space. That is, the distance calculation unit calculates the distance between the feature amount calculated in each frame constituting the reference moving image data and the feature amount calculated in each frame constituting the synchronization target moving image data. For example, the distance calculation unit calculates the distance between a feature amount related to a frame constituting the reference moving image data and a feature amount related to a frame constituting the synchronization target moving image data in a brute-force manner. The synchronization processing unit calculates an optimal path for each frame based on the calculated distance. For example, the synchronization processing unit calculates an optimal path for each frame based on the calculated distance. The synchronization processing unit synchronizes the synchronization target moving image data with the reference moving image data by aligning the timings of the frames connected by the optimal path. The output unit outputs the synchronization target moving image data synchronized with the reference moving image data.

The data conversion device in the present example embodiment synchronizes the synchronization target moving image data with the reference moving image data, based on the feature of the posture data estimated in each frame constituting the moving image data. Therefore, the synchronization target moving image data is synchronized with the reference moving image data with reference to the synchronization target motion included in the reference moving image data without being affected by the background. The data conversion device in the present example embodiment synchronizes the synchronization target moving image data with the reference moving image data, based on the feature of the posture data normalized into the angular representation. Therefore, the synchronization target moving image data is synchronized with high accuracy with the reference moving image data with reference to the synchronization target motion included in the reference moving image data. That is, according to the present example embodiment, it is possible to synchronize synchronization target motions included in a plurality of moving image data with high accuracy without being affected by the background.

In general, it is difficult to synchronize the synchronization target motions included in the two pieces of moving image data, based on the image included in the frame constituting the moving image data. In the present example embodiment, frames constituting moving image data are dropped into an embedded space. In the embedded space, the distance between the feature amounts can be calculated. In the present example embodiment, the same motions are associated with each other using the distance in the embedded space. In the present example embodiment, synchronization is performed using the DTW method based on the feature amount extracted in each frame. Therefore, according to the present example embodiment, it is possible to synchronize the two pieces of moving image data with higher accuracy than in the case of synchronizing by directly using the posture data converted into the angular representation.

According to the method of the present example embodiment, the synchronization target moving image data and the reference moving image data are contracted and synchronized in the time direction, with the timing of the synchronization target motion included in the synchronization target moving image data aligned with the timing of the synchronization target motion included in the reference moving image data. Therefore, the synchronization target motion included in the reference moving image data and the synchronization target motion included in the synchronization target moving image data are normalized in the time direction. Therefore, according to the present example embodiment, moving image data can be extended even without annotations such as tags and metadata. According to the present example embodiment, it is possible to extend moving image data including motions in which motion timings and speeds of various types of human motion data are aligned.

Third Example Embodiment

Next, a data conversion device according to a third example embodiment will be described with reference to the drawings. The data conversion device of the present example embodiment synchronizes a plurality of pieces of synchronization target moving image data with each other using an encoder trained by the learning device of the first example embodiment.

(Configuration)

Figure 12:
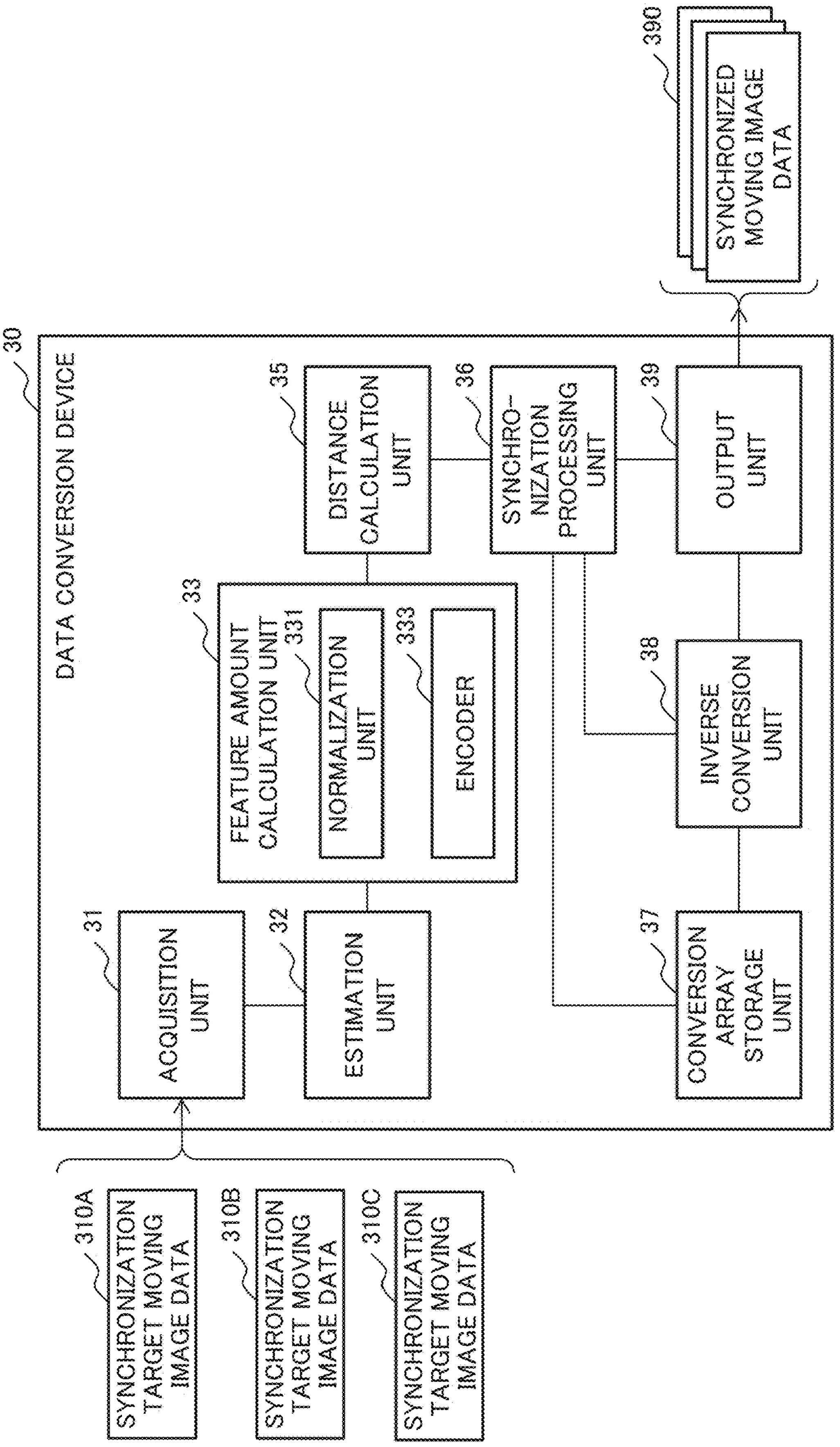
FIG. 12 is a block diagram illustrating an example of a configuration of a data conversion device according to a third example embodiment.

FIG. 12 is a block diagram illustrating an example of a configuration of a data conversion device 30 according to the present example embodiment. The data conversion device 30 includes an acquisition unit 31, an estimation unit 32, a feature amount calculation unit 33, a distance calculation unit 35, a synchronization processing unit 36, a conversion array storage unit 37, an inverse conversion unit 38, and an output unit 39.

The acquisition unit 31 acquires a plurality of pieces of synchronization target moving image data 310. In the example of FIG. 12, the acquisition unit 31 acquires synchronization target moving image data 310A, synchronization target moving image data 310B, and synchronization target moving image data 310C. The acquisition unit 31 may acquire four or more pieces of synchronization target moving image data 310. The synchronization target moving image data 310A, the synchronization target moving image data 310B, and the synchronization target moving image data 310C include common synchronization target motions. The type of the synchronization target motion is not particularly limited as long as it can be extracted from the frames constituting the moving image data.

The estimation unit 32 has the same configuration as the estimation unit 12 in the first example embodiment. The estimation unit 32 extracts a person in each frame constituting the plurality of pieces of synchronization target moving image data 310. The estimation unit 32 estimates the posture data of the extracted person. For example, the estimation unit 32 estimates the posture data of the person extracted from the plurality of pieces of synchronization target moving image data 310 by using a deep learning model. The estimation unit 32 estimates spatial positions of representative parts as the posture data of the person extracted from the plurality of pieces of synchronization target moving image data 310.

The feature amount calculation unit 33 has the same configuration as the feature amount calculation unit 13 in the first example embodiment. The feature amount calculation unit 33 includes a normalization unit 331 and an encoder 333. The normalization unit 331 has the same configuration as the normalization unit 131 in the first example embodiment. The encoder 333 has the same configuration as the encoder 133 in the first example embodiment. The feature amount calculation unit 33 uses the normalization unit 331 to normalize the posture data into an angular representation. The feature amount calculation unit 33 uses the encoder 333 to extract feature amounts related to the synchronization target motion from the posture data having been normalized into the angular representation.

The distance calculation unit 35 has the same configuration as the distance calculation unit 25 in the second example embodiment. The distance calculation unit 35 calculates the distance of a feature amount calculated for each of the plurality of pieces of synchronization target moving image data 310. That is, the distance calculation unit 35 calculates the distance of a feature amount calculated for each of the plurality of pieces of synchronization target moving image data 310. The distance calculation unit 35 calculates the distance in the embedded space.

The synchronization processing unit 36 has the same configuration as the synchronization processing unit 26 in the second example embodiment. The synchronization processing unit 36 sets one of the plurality of pieces of synchronization target moving image data 310 as the reference moving image data. For example, the synchronization processing unit 36 sets the synchronization target moving image data 310A as the reference moving image data. For example, the synchronization processing unit 36 synchronizes the synchronization target moving image data 310B or the synchronization target moving image data 310C with the synchronization target moving image data 310A, with reference to the synchronization target motion included in the synchronization target moving image data 310A. The synchronization processing unit 36 may set the synchronization target moving image data 310B or the synchronization target moving image data 310C as the reference moving image data.

The synchronization processing unit 36 calculates the optimal path for each frame based on the distance calculated by the distance calculation unit 35. The synchronization processing unit 36 synchronizes the synchronization target moving image data with the reference moving image data by aligning the timings of the frames connected by the optimal path. The synchronization processing unit 36 synchronizes the synchronization target moving image with the reference moving image data, with reference to the synchronization target motion included in the reference moving image data. As a result, the most similar motions included in the reference moving image data and the synchronization target moving image data are associated with each other. The synchronization processing unit 36 then synchronizes the motions included in the reference moving image data and the synchronization target moving image data by aligning the timings of the frames including the associated motions.

The synchronization processing unit 36 stores the conversion array used for synchronization of the synchronization target moving image data 310 in the conversion array storage unit 37. For example, the synchronization processing unit 36 stores the conversion array used for synchronization of the synchronization target moving image data 310B or the synchronization target moving image data 310C with the synchronization target moving image data 310A as the reference moving image data, in the conversion array storage unit 37. The synchronization processing unit 36 also outputs the unsynchronized synchronization target moving image data 310 to the inverse conversion unit 38. The synchronization target moving image data 310 output to the inverse conversion unit 38 is used for synchronization of the synchronization target moving image data 310 that was used as the reference moving image data.

The conversion array storage unit 37 stores the conversion array used for synchronization of the synchronization target moving image data 310. For example, the conversion array storage unit 37 stores the conversion array used for synchronization of the synchronization target moving image data 310B or the synchronization target moving image data 310C with the synchronization target moving image data 310A as the reference moving image data. The conversion array stored in the conversion array storage unit 37 is used for synchronization of the synchronization target moving image data 310 that has not been synchronized by the synchronization processing unit 36. The synchronization target moving image data 310 having not been synchronized by the synchronization processing unit 36 corresponds to the synchronization target moving image data 310 that was used as the reference moving image data.

The inverse conversion unit 38 acquires the unsynchronized synchronization target moving image data 310 from the synchronization processing unit 36. The inverse conversion unit 38 acquires the conversion array to be used for synchronization of the acquired synchronization target moving image data 310. For example, in the case of synchronizing the synchronization target moving image data 310A with the synchronization target moving image data 310B, the inverse conversion unit 38 acquires the conversion array that was used for synchronization of the synchronization target moving image data 310B with the synchronization target moving image data 310A. For example, in the case of synchronizing the synchronization target moving image data 310A with the synchronization target moving image data 310C, the inverse conversion unit 38 acquires the conversion array that was used for synchronization of the synchronization target moving image data 310C to the synchronization target moving image data 310A.

The inverse conversion unit 38 uses the conversion array to perform inverse conversion on the synchronization target moving image data 310 that was used as the reference moving image data. The inverse conversion unit 38 synchronizes one piece of the synchronization target moving image data 310 that was used as the reference moving image data with another piece of the synchronization target moving image data 310 that was not used as the reference moving image data, with reference to the other piece of the synchronization target moving image data 310. For example, the inverse conversion unit 38 synchronizes the synchronization target moving image data 310A with the synchronization target moving image data 310B, using the conversion array that was used for synchronization of the synchronization target moving image data 310B with the synchronization target moving image data 310A. For example, the inverse conversion unit 38 synchronizes the synchronization target moving image data 310A with the synchronization target moving image data 310C, using the conversion array that was used for synchronization of the synchronization target moving image data 310C with the synchronization target moving image data 310A.

The output unit 39 outputs synchronized moving image data 390. The synchronized moving image data 390 is used for learning of the learning target motion. The synchronized moving image data 390 increases according to the number of pieces of synchronization target moving image data 310 to be processed. That is, the data conversion device 30 extends the moving image data including the learning target motion by increasing the synchronized moving image data 390 using the synchronization target moving image data 310.

The use application of the synchronized moving image data 390 output from the output unit 39 is not limited to the extension of the learning target motion. The synchronized moving image data 390 may be displayed on the screen of a terminal device that is viewable for the user who verifies the synchronization target motion. For example, one piece of the synchronized moving image data 390 may be displayed on the screen of the terminal device side by side with another piece of the synchronized moving image data 390 synchronized with the one piece of the synchronized moving image data 390. For example, the synchronized moving image data 390 may be displayed on the screen of the terminal device side by side with the synchronized moving image data 390 before synchronization.

(Operation)

Figure 13:
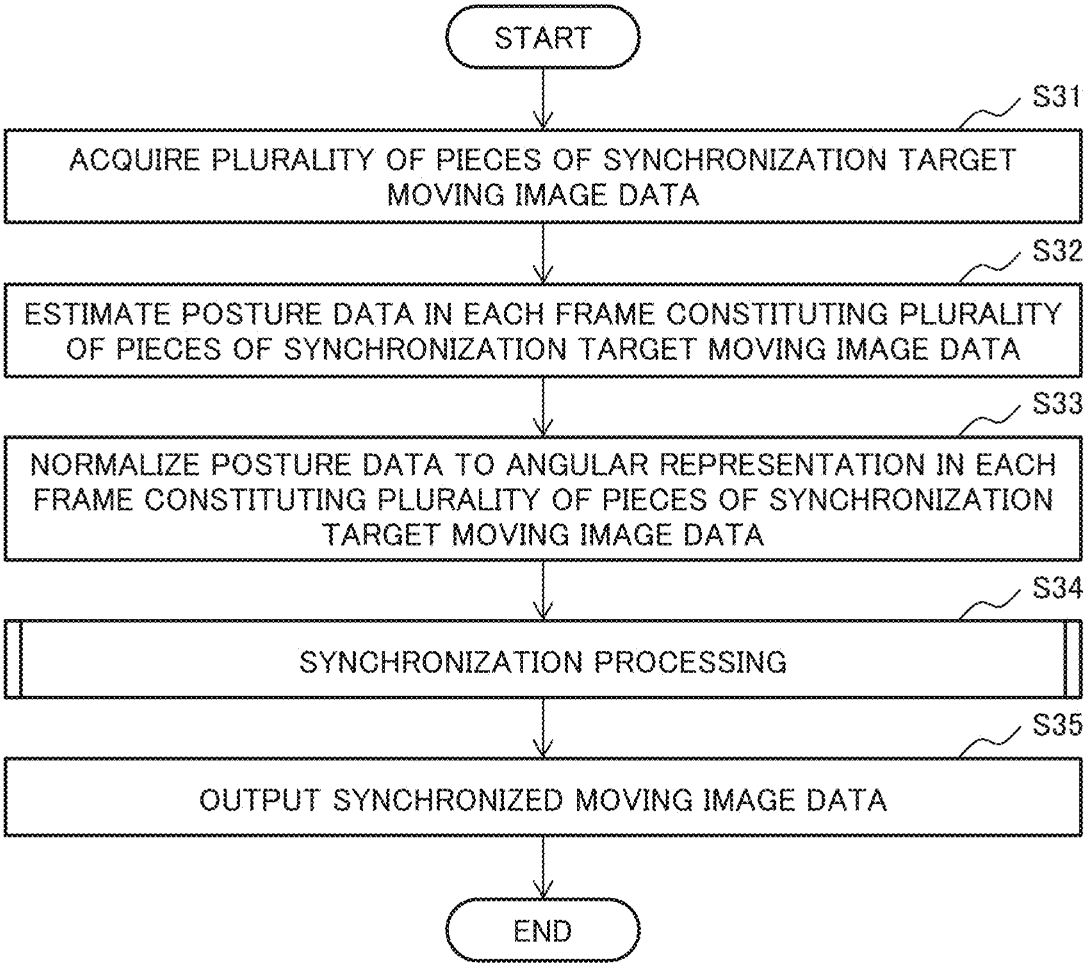
FIG. 13 is a flowchart for describing an example of operations of the data conversion device according to the third example embodiment.

Next, operations of the data conversion device 30 will be described with reference to the drawings. FIG. 13 is a flowchart for describing an example of operations of the data conversion device 30. The description along the flowchart in FIG. 13 is based on the assumption that the data conversion device 30 performs the operations.

Referring to FIG. 13, first, the data conversion device 30 acquires a plurality of pieces of synchronization target moving image data 310 (step S31).

Next, the data conversion device 30 estimates posture data in each frame constituting the plurality of pieces of synchronization target moving image data 310 (step S32).

The data conversion device 30 then normalizes the posture data into an angular representation in each frame constituting the plurality of pieces of synchronization target moving image data 310 (step S33).

The data conversion device 30 then executes synchronization processing (step S34). In the synchronization processing in step S34, the data conversion device 30 uses the posture data normalized into the angular representation to synchronize the motion included in one piece of the synchronization target moving image data 310 with the motion included in another piece of the synchronization target moving image data 310. Details of the synchronization processing in step S34 will be described later.

Next, the data conversion device 30 outputs the synchronized moving image data 390 synchronized in the synchronization processing (step S35). The output synchronized moving image data 390 is used for learning of the learning target motion. The output synchronized moving image data 390 may be displayed on the screen.

[Synchronization Processing]

Figure 14:
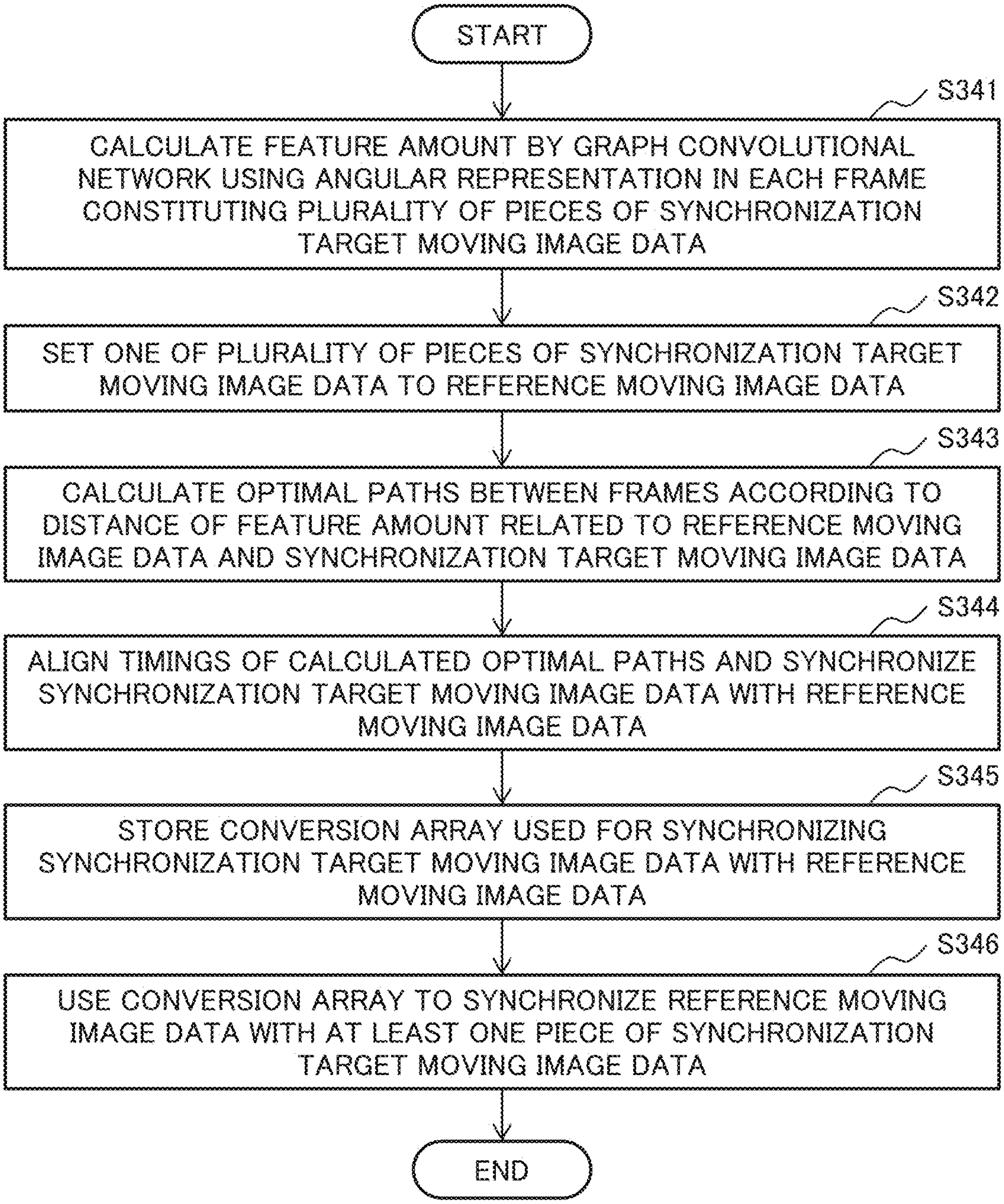
FIG. 14 is a flowchart for describing an example of synchronization processing by the data conversion device according to the third example embodiment.

Next, an example of synchronization processing (step S34 in FIG. 13) by the data conversion device 30 will be described with reference to the drawings. FIG. 14 is a flowchart for describing synchronization processing (step S34 in FIG. 13). The description along the flowchart in FIG. 14 is based on the assumption that the data conversion device 30 performs the operations.

Referring to FIG. 14, first, the data conversion device 30 calculates the feature amount by a graph convolutional network using the angular representation in each frame constituting a plurality of pieces of synchronization target moving image data 310 (step S341).

Next, the data conversion device 30 sets one of the plurality of pieces of synchronization target moving image data 310 as reference moving image data (step S342).

The data conversion device 30 then calculates an optimal path between frames according to the distance of the feature amount with respect to the reference moving image data and the synchronization target moving image data 310 (step S343).

The data conversion device 30 then synchronizes the synchronization target moving image data with the reference moving image data 310 by aligning the timings of the calculated optimal paths (step S344).

The data conversion device 30 then stores the conversion array that was used for synchronization of the synchronization target moving image data 310 with the reference moving image data, in the conversion array storage unit 37 (step S345).

The data conversion device 30 then uses the conversion array to synchronize the reference moving image data with any one of the synchronization target moving image data 310 (step S346). After step S346, the processing proceeds to step S35 in FIG. 13.

As described above, the data conversion device in the present example embodiment includes the acquisition unit, the estimation unit, the feature amount calculation unit, the distance calculation unit, the synchronization processing unit, and the output unit. The acquisition unit acquires a plurality of pieces of synchronization target moving image data. The estimation unit estimates posture data in each frame constituting the plurality of pieces of synchronization target moving image data. The feature amount calculation unit has the encoder including the graph convolutional network. For example, the encoder convolves posture data normalized into an angular representation by graph convolution, and outputs an embedding in an embedded space as a feature amount. The feature amount calculation unit normalizes posture data estimated in each frame constituting the plurality of pieces of synchronization target moving image data into an angular representation. The feature amount calculation unit inputs the posture data normalized into the angular representation to the encoder and calculates the feature amount in the embedded space. The distance calculation unit calculates the distance of the feature amount calculated in each frame constituting the plurality of pieces of synchronization target moving image data. For example, the distance calculation unit calculates the distance to a feature amount related to each frame constituting a plurality of pieces of synchronization target moving image data in a brute-force manner. The synchronization processing unit calculates an optimal path for each frame based on the calculated distance. For example, the synchronization processing unit calculates an optimal path for each frame based on the calculated distance. The synchronization processing unit synchronizes the plurality of pieces of synchronization target moving image data with each other by aligning timings of frames connected by the optimal path. The output unit outputs the synchronized synchronization target moving image data.

The data conversion device of the present example embodiment sets one of the plurality of pieces of synchronization target moving image data as reference moving image data. The data conversion device of the present example embodiment synchronizes a plurality of pieces of synchronization target moving image data with reference moving image data and converts the plurality of pieces of synchronization target moving image data into synchronized moving image data. Therefore, according to the present example embodiment, it is possible to synchronize a plurality of pieces of synchronization target moving image data with each other.

The data conversion device according to one aspect of the present example embodiment further includes the conversion array storage unit and the inverse conversion unit. The conversion array storage unit stores a conversion array that was used for synchronization of the synchronization target moving image data. The inverse conversion unit uses the conversion array to perform inverse conversion on the synchronization target moving image data that was used as the reference moving image data. The synchronization processing unit sets one of the plurality of pieces of synchronization target moving image data as the reference moving image data. The synchronization processing unit calculates an optimal path for each frame based on the calculated distance. The synchronization processing unit synchronizes the synchronization target moving image data with the reference moving image data by aligning the timings of the frames connected by the optimal path. The synchronization processing unit stores the conversion array used for synchronization of the synchronization target moving image data in the conversion array storage unit. The inverse conversion unit synchronizes one piece of the synchronization target moving image data that was used as the reference moving image data with another piece of the synchronization target moving image data that was not used as the reference moving image data, with reference to the other piece of the synchronization target moving image data.

The data conversion device of the present aspect stores a conversion array that was used for synchronization of a plurality of pieces of synchronization target moving image data. The data conversion device of the present example embodiment uses the conversion array to synchronize one piece of the reference moving image data with another piece of the synchronization target moving image data. The conversion array may be used for arbitrary synchronization target moving image data. As described above, according to the present example embodiment, it is possible to synchronize the reference moving image data with the synchronization target moving image data by using the conversion array, without performing processing of synchronizing the reference moving image data with the synchronization target moving image data. For example, if there are 2N pieces of synchronization target moving image data, $N^2$ pieces of synchronized moving image data can be expressed using 2(N−1) conversion arrays (N is a natural number). According to the present example embodiment, it is possible to reduce the amount of calculation in processing of synchronizing a plurality of pieces of synchronization target moving image data with each other.

Fourth Example Embodiment

Next, a moving image conversion system 40 according to a fourth example embodiment will be described with reference to the drawings. The moving image conversion system 40 of the present example embodiment has a configuration in which the learning device of the first example embodiment and the data conversion devices of the second and third example embodiments are combined.

(Configuration)

Figure 15:
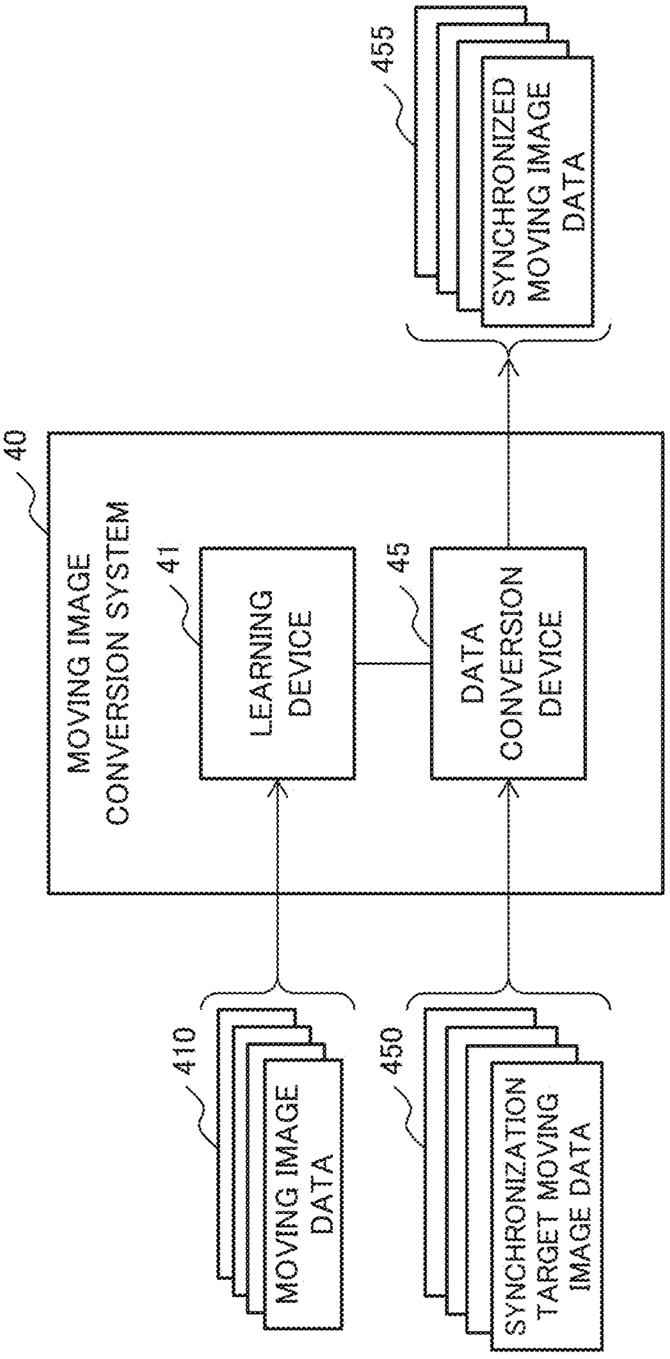
FIG. 15 is a block diagram illustrating an example of a configuration of a moving image conversion system according to a fourth example embodiment.

FIG. 15 is a block diagram illustrating an example of the moving image conversion system 40 according to the present example embodiment. The moving image conversion system 40 includes a learning device 41 and a data conversion device 45. The learning device 41 has the same configuration as the learning device 10 of the first example embodiment. The data conversion device 45 has the same configuration as the data conversion device 20 of the second example embodiment or the data conversion device 30 of the third example embodiment.

The learning device 41 and the data conversion device 45 include the feature amount calculation units (not illustrated) presented in the first to third example embodiments. At least one of the learning device 41 and the data conversion device 45 may include the feature amount calculation unit. For example, the data conversion device 45 is connected to the feature amount calculation unit included in the learning device 41. For example, the learning device 41 is connected to the feature amount calculation unit included in the data conversion device 45. For example, each of the learning device 41 and the data conversion device 45 individually includes the same feature amount calculation unit. For example, the learning device 41 and the data conversion device 45 may be configured to access a feature amount calculation unit arranged in a cloud or a server outside the moving image conversion system 40.

The learning device 41 acquires moving image data 410 as a learning target. The learning device 41 causes an encoder included in the feature amount calculation unit to learn using the acquired moving image data 410. The learning device 41 updates the encoder according to the result of learning. If the learning device 41 and the data conversion device 45 use different feature amount calculation units, the encoder included in the feature amount calculation unit used by the data conversion device 45 is also updated according to the result of learning by the learning device 41. In the present example embodiment, the encoder included in the feature amount calculation unit used by the data conversion device 45 is updated as appropriate according to the result of learning by the learning device 41.

The data conversion device 45 acquires synchronization target moving image data 450. The data conversion device 45 converts the acquired synchronization target moving image data 450 into synchronized moving image data 455 using the encoder included in the feature amount calculation unit. The data conversion device 45 outputs the synchronized moving image data 455.

The synchronized moving image data 455 is used for learning of synchronization target motion (learning target motion). The synchronized moving image data 455 increases according to the number of pieces of synchronization target moving image data 450 to be processed. That is, the moving image conversion system extends the moving image data including the learning target motion by increasing the synchronized moving image data 455 using the synchronization target moving image data 450. The use application of the synchronized moving image data 455 is not limited to the extension of the learning target motion. For example, the synchronized moving image data 455 may be displayed on the screen of a terminal device that is viewable for the user who verifies the synchronization target motion.

As described above, the moving image conversion system of the present example embodiment includes the learning device and the data conversion device. The learning device is the learning device of the first example embodiment. The data conversion device is the data conversion device of the second or third example embodiment. The learning device causes the encoder to learn learning target moving image data including the learning target motion. The learning device updates the encoder according to the result of learning. The data conversion device uses the encoder updated by the learning device to acquire the synchronization target moving image data including the synchronization target motion corresponding to the learning target motion and the reference moving image data. The data conversion device uses the encoder to synchronize the synchronization target moving image data with the reference moving image data.

The moving image conversion system of the present example embodiment updates the encoder using the learning target moving image data including the extended moving image data. The learning target moving image data may include synchronized synchronization target moving image data synchronized by the data conversion device. The moving image conversion system of the present example embodiment can synchronize the synchronization target moving image data with the reference moving image data by using a high-precision encoder. The moving image conversion system of the present example embodiment can extend the learning target moving image data with high accuracy by an encoder updated as appropriate using the learning target moving image data in which the learning target motion is synchronized. Therefore, according to the present example embodiment, it is possible to construct an encoder with accuracy equal to or higher than that in the case of using a large amount of data based on actually measured moving image data that is difficult to prepare in a large amount.

Fifth Example Embodiment

Figure 16:
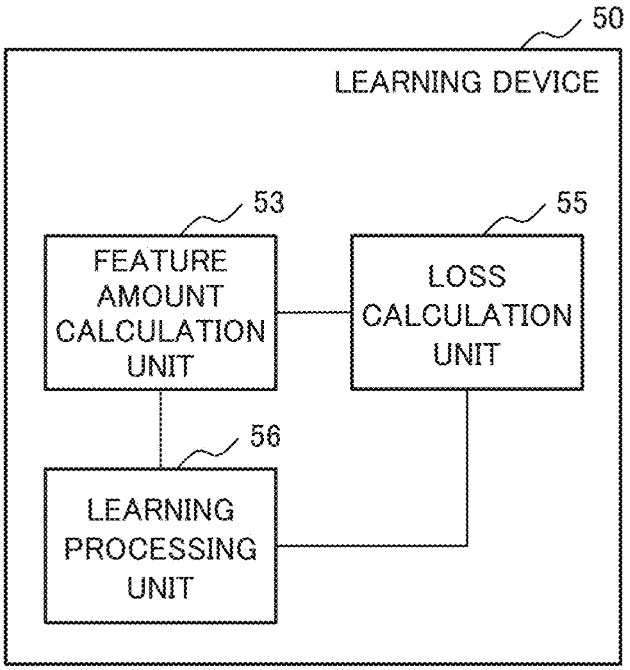
FIG. 16 is a block diagram illustrating an example of a configuration of a learning device according to a fifth example embodiment.

Next, a learning device according to a fifth example embodiment will be described with reference to the drawings. The learning device of the present embodiment has a simplified configuration of the learning device 10 according to the first embodiment. FIG. 16 is a block diagram illustrating an example of a configuration of a learning device 50 according to the present example embodiment. The learning device 50 includes a feature amount calculation unit 53, a loss calculation unit 55, and a learning processing unit 56.

The feature amount calculation unit 53 includes an encoder including a graph convolutional network. The feature amount calculation unit 53 normalizes posture data estimated in each frame constituting learning target moving image data including a synchronization target motion into an angular representation. The feature amount calculation unit 53 inputs the posture data normalized into the angular representation to the encoder and calculates the feature amount in the embedded space.

The loss calculation unit 55 calculates a loss according to the feature amount calculated by the encoder. The learning processing unit 56 trains the encoder based on the calculated loss gradient.

The learning device of the present example embodiment trains the encoder based on the loss according to the feature amount related to the posture data estimated in each frame constituting the learning target moving image data. The posture data is normalized into an angular representation. In addition, the feature amount is calculated in the embedded space. Therefore, according to the present example embodiment, the encoder can be trained in such a way that synchronization target motions included in a plurality of pieces of synchronization target moving image data can be synchronized with high accuracy without being affected by the background. The encoder trained by the learning device of the present example embodiment can be used for data conversion in synchronizing the synchronization target motions included in a plurality of pieces of moving image data.

Sixth Example Embodiment

Figure 17:
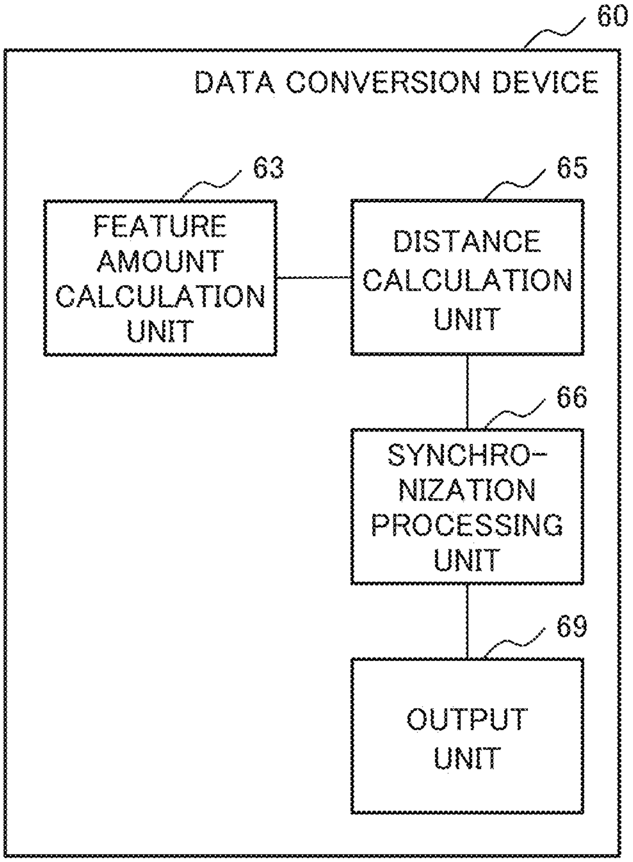
FIG. 17 is a block diagram illustrating an example of a configuration of a data conversion device according to a sixth example embodiment.

Next, a data conversion device according to a sixth example embodiment will be described with reference to the drawings. The data conversion device according to the present example embodiment has a simplified configuration of the data conversion devices according to the second and third example embodiments. FIG. 17 is a block diagram illustrating an example of a configuration of a data conversion device 60 according to the present example embodiment. The data conversion device 60 includes a feature amount calculation unit 63, a distance calculation unit 65, a synchronization processing unit 66, and an output unit 69.

The feature amount calculation unit 63 includes an encoder including a graph convolutional network. The feature amount calculation unit 63 normalizes posture data estimated in each frame constituting moving image data including the synchronization target motion into an angular representation. The feature amount calculation unit 63 inputs the posture data normalized into the angular representation to the encoder and calculates the feature amount in the embedded space.

That is, the distance calculation unit 65 calculates the distance between the feature amount calculated in each frame constituting the reference moving image data and the feature amount calculated in each frame constituting the synchronization target moving image data. The synchronization processing unit 66 calculates an optimal path for each frame based on the calculated distance. The synchronization processing unit 66 synchronizes the synchronization target moving image data with the reference moving image data by aligning the timings of the frames connected by the optimal path. The output unit 69 outputs the synchronization target moving image data synchronized with the reference moving image data.

The data conversion device in the present example embodiment synchronizes the synchronization target moving image data with the reference moving image data, based on the feature of the posture data estimated in each frame constituting the moving image data. Therefore, the synchronization target moving image data is synchronized with the reference moving image data with reference to the synchronization target motion included in the reference moving image data without being affected by the background. The data conversion device in the present example embodiment synchronizes the synchronization target moving image data with the reference moving image data, based on the feature of the posture data normalized into the angular representation. Therefore, the synchronization target moving image data is synchronized with high accuracy with the reference moving image data with reference to the synchronization target motion included in the reference moving image data. That is, according to the present example embodiment, it is possible to synchronize synchronization target motions included in a plurality of moving image data with high accuracy without being affected by the background.

(Hardware)

Next, a hardware configuration for executing control and processing according to each example embodiment of the present disclosure will be described with reference to the drawings. Herein, an example of such a hardware configuration is an information processing apparatus 90 (computer) in FIG. 18. The information processing apparatus 90 in FIG. 18 is taken as a configuration example for executing control and processing in each embodiment, and does not limit the scope of the present disclosure.

Figure 18:
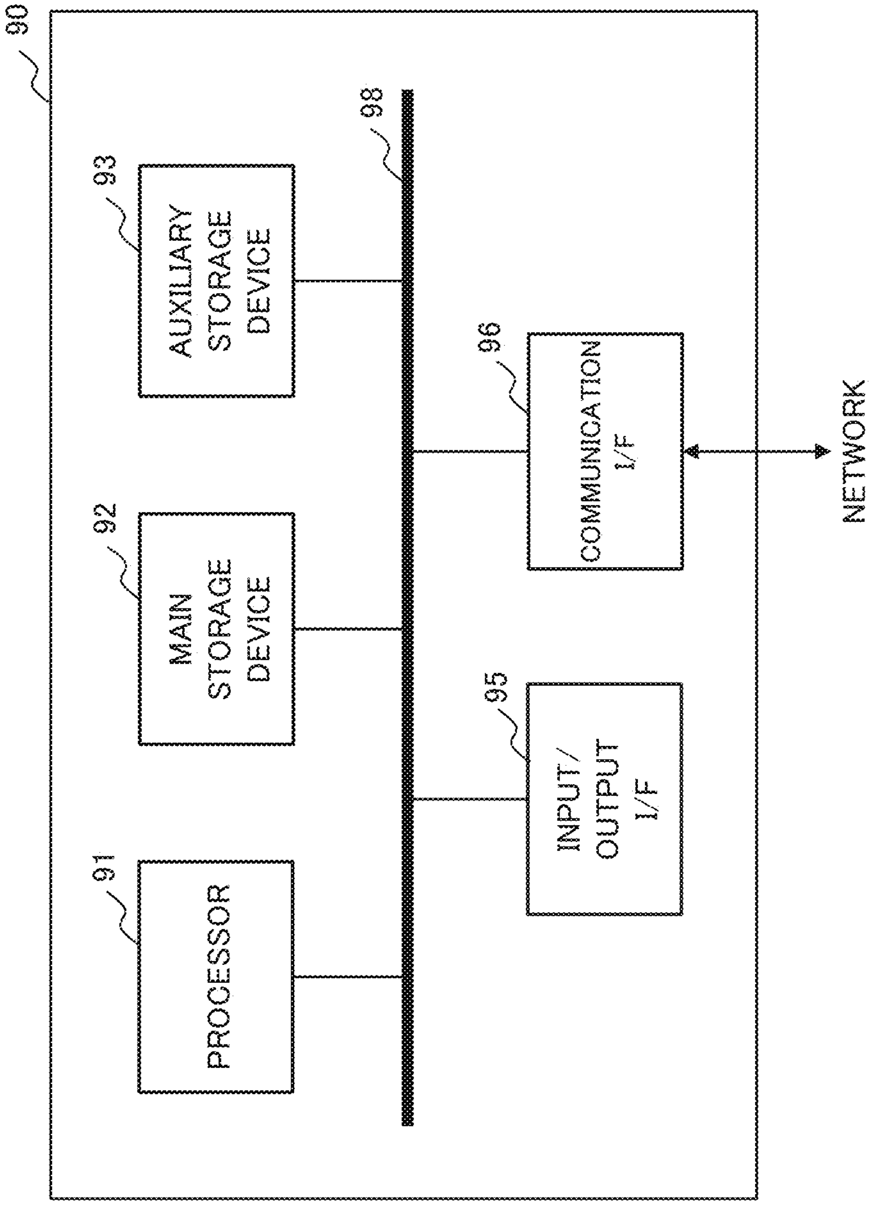
FIG. 18 is a block diagram illustrating an example of a hardware configuration that executes processing and control according to each example embodiment.

As illustrated in FIG. 18, the information processing apparatus 90 includes a processor 91, a main storage device 92, an auxiliary storage device 93, an input/output interface 95, and a communication interface 96. In FIG. 18, the interface is abbreviated as an interface (I/F). The processor 91, the main storage device 92, the auxiliary storage device 93, the input/output interface 95, and the communication interface 96 are connected to each other in a data-communicable manner via a bus 98. The processor 91, the main storage device 92, the auxiliary storage device 93, and the input/output interface 95 are connected to a network such as the Internet or an intranet via the communication interface 96.

The processor 91 develops programs (orders) stored in the auxiliary storage device 93 or the like, in the main storage device 92. For example, the programs are software programs for executing control and processing of each embodiment. The processor 91 executes the programs developed in the main storage device 92. The processor 91 executes the programs to execute control and processing according to each embodiment.

The main storage device 92 has an area in which the programs are to be developed. The programs stored in the auxiliary storage device 93 or the like are developed by the processor 91 in the main storage device 92. The main storage device 92 is implemented by a volatile memory such as a dynamic random access memory (DRAM), for example. A nonvolatile memory such as a magneto resistive random access memory (MRAM) may be configured/added as the main storage device 92.

The auxiliary storage device 93 stores various types of data such as programs. The auxiliary storage device 93 is implemented by a local disk such as a hard disk or a flash memory. The various types of data may be stored in the main storage device 92, and the auxiliary storage device 93 may be omitted.

The input/output interface 95 is an interface for connecting the information processing apparatus 90 and a peripheral device based on a standard or a specification. The communication interface 96 is an interface for connecting to an external system or device through a network such as the Internet or an intranet based on a standard or a specification.

The input/output interface 95 and the communication interface 96 may be unified as an interface connected to an external device.

Input devices such as a keyboard, a mouse, and a touch panel may be connected to the information processing apparatus 90 as necessary. These input devices are used to input information and settings. If a touch panel is used as an input device, a screen having a touch panel function serves as an interface. The processor 91 and the input devices are connected via the input/output interface 95.

The information processing apparatus 90 may be provided with a display device for displaying information. If a display device is provided, the information processing apparatus 90 includes a display control device (not illustrated) for controlling display on the display device. The information processing apparatus 90 and the display device are connected via the input/output interface 95.

The information processing device 90 may be provided with a drive device. The drive device mediates reading of data and programs from a recording medium (program recording medium), writing of a processing result of the control device 90 to the recording medium, and the like, between the processor 91 and the recording medium. The information processing device 90 and the drive device are connected via the input/output interface 95.

The above is an example of a hardware configuration for enabling control and processing according to each embodiment of the present disclosure. The hardware configuration in FIG. 18 is an example of a hardware configuration for executing control and processing according to each embodiment, and does not limit the scope of the present disclosure. Programs for causing a computer to execute control and processing according to each embodiment are also included in the scope of the present disclosure.

Further, a program recording medium in which the programs according to each example embodiment are recorded is also included in the scope of the present invention. The recording medium can be implemented by an optical recording medium such as a compact disc (CD) or a digital versatile disc (DVD), for example. The recording medium may be implemented by a semiconductor recording medium such as a universal serial bus (USB) memory or a secure digital (SD) card. The recording medium may be implemented by a magnetic recording medium such as a flexible disk, or another recording medium. When programs executed by the processor are recorded in a recording medium, the recording medium corresponds to a program recording medium.

The components of the example embodiments may be arbitrarily combined. The components of the example embodiments may be implemented by software. The components of the example embodiments may be implemented by a circuit.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A data conversion device comprising:

a memory storing instructions; and a processor connected to the memory and configured to execute the instructions to:

normalize posture data estimated in each frame constituting moving image data including a synchronization target motion into an angular representation by calculating Euler angles formed by connection lines connecting joints of a person extracted from each frame;

calculate a feature amount in an embedded space by inputting the posture data normalized into the angular representation to an encoder including a graph convolutional network that performs graph convolution regarding adjacent joints represented in a skeleton form as a graph structure;

calculate a distance between a feature amount calculated in each frame constituting reference moving image data and a feature amount calculated in each frame constituting synchronization target moving image data using dynamic time warping;

calculate an optimal path for each frame based on the calculated distance;

synchronize the synchronization target moving image data with the reference moving image data by aligning timings of frames connected by the optimal path to align timing of the synchronization target motion included in the synchronization target moving image data with timing of the synchronization target motion included in the reference moving image data, wherein the processor is further configured to execute the instructions to synchronize the synchronization target moving image data with the reference moving image data by:

storing a conversion array used for synchronization of the synchronization target moving image data, performing inverse conversion of the synchronization target moving image data used as the reference moving image data, by using the conversion array, setting one of the plurality of pieces of synchronization target moving image data as the reference moving image data, calculating the optimal path for each frame based on the calculated distance, synchronizing the synchronization target moving image data with the reference moving image data by aligning timings of frames connected by the optimal path, storing the conversion array used for synchronization of the synchronization target moving image data in the conversion array storage means, and synchronizing one piece of the synchronization target moving image data used as the reference moving image data with another piece of the synchronization target moving image data not used as the reference moving image data, with reference to the another piece of the synchronization target moving image data; and output the synchronization target moving image data synchronized with the reference moving image data.

2. The data conversion device according to claim 1, wherein the encoder convolves the posture data normalized into the angular representation by graph convolution and outputs an embedding in the embedded space as the feature amount in the embedded space.

3. The data conversion device according to claim 2, wherein the processor is configured to execute the instructions to calculate the distance between the feature amount calculated in each frame constituting the reference moving image data and the feature amount calculated in each frame constituting the synchronization target moving image data in a brute-force manner, and calculate the optimal path for each frame based on the calculated distance.

4. A moving image conversion system comprising:

the data conversion device according to claim 1; and a learning device including a memory storing instructions; and a processor connected to the memory and configured to execute the instructions to normalize posture data estimated in each frame constituting learning target moving image data including a synchronization target motion into an angular representation by calculating Euler angles formed by connection lines connecting joints of a person extracted from each frame;

calculate a feature amount in an embedded space by inputting the posture data normalized into the angular representation to an encoder including a graph convolutional network that performs graph convolution regarding adjacent joints represented in a skeleton form as a graph structure;

calculate a loss in accordance with the feature amount calculated by the encoder; and train the encoder based on a gradient of the calculated loss.

5. The moving image conversion system according to claim 4, wherein the processor of the learning device is configured to execute the instructions to cause an encoder to learn learning target moving image data including a learning target motion, and update the encoder in accordance with a learning result, and the processor of the data conversion device is configured to execute the instructions to acquire synchronization target moving image data and reference moving image data including a synchronization target motion equivalent to the learning target motion by using the encoder updated by the learning device, and synchronize the synchronization target moving image data with the reference moving image data by using the encoder.

6. A data conversion method executed by a computer, the method comprising—:

normalizing posture data estimated in each frame constituting moving image data including a synchronization target motion into an angular representation by calculating Euler angles formed by connection lines connecting joints of a person extracted from each frame;

inputting the posture data normalized into the angular representation to an encoder including a graph convolutional network that performs graph convolution regarding adjacent joints represented in a skeleton form as a graph structure to calculate a feature amount in an embedded space;

calculating a distance between a feature amount calculated in each frame constituting the reference moving image data and a feature amount calculated in each frame constituting the synchronization target moving image data using dynamic time warping;

calculating an optimal path for each frame based on the calculated distance;

synchronizing the synchronization target moving image data with the reference moving image data by aligning timings of frames connected by the optimal path to align timing of the synchronization target motion included in the synchronization target moving image data with timing of the synchronization target motion included in the reference moving image data, wherein the synchronizing the synchronization target moving image data with the reference moving image data further comprises:

storing a conversion array used for synchronization of the synchronization target moving image data;

performing inverse conversion of the synchronization target moving image data used as the reference moving image data by using the conversion array;

setting one of the plurality of pieces of synchronization target moving image data as the reference moving image data;

calculating the optimal path for each frame based on the calculated distance;

synchronizing the synchronization target moving image data with the reference moving image data by aligning timings of frames connected by the optimal path;

storing the conversion array used for synchronization of the synchronization target moving image data in the conversion array storage means; and synchronizing one piece of the synchronization target moving image data used as the reference moving image data with another piece of the synchronization target moving image data not used as the reference moving image data, with reference to the another piece of the synchronization target moving image data; and outputting the synchronization target moving image data synchronized with the reference moving image data.

7. A non-transitory recording medium recording a program for causing a computer to execute:

normalizing posture data estimated in each frame constituting moving image data including a synchronization target motion into an angular representation by calculating Euler angles formed by connection lines connecting joints of a person extracted from each frame;

inputting the posture data normalized into the angular representation to an encoder including a graph convolutional network that performs graph convolution regarding adjacent joints represented in a skeleton form as a graph structure to calculate a feature amount in an embedded space;

calculating a distance between a feature amount calculated in each frame constituting the reference moving image data and a feature amount calculated in each frame constituting the synchronization target moving image data using dynamic time warping;

calculating an optimal path for each frame based on the calculated distance;

synchronizing the synchronization target moving image data with the reference moving image data by aligning timings of frames connected by the optimal path to align timing of the synchronization target motion included in the synchronization target moving image data with timing of the synchronization target motion included in the reference moving image data, wherein the synchronizing the synchronization target moving image data with the reference moving image data further comprises:

storing a conversion array used for synchronization of the synchronization target moving image data;

performing inverse conversion of the synchronization target moving image data used as the reference moving image data by using the conversion array;

setting one of the plurality of pieces of synchronization target moving image data as the reference moving image data;

calculating the optimal path for each frame based on the calculated distance;

synchronizing the synchronization target moving image data with the reference moving image data by aligning timings of frames connected by the optimal path;

storing the conversion array used for synchronization of the synchronization target moving image data in the conversion array storage means; and synchronizing one piece of the synchronization target moving image data used as the reference moving image data with another piece of the synchronization target moving image data not used as the reference moving image data, with reference to the another piece of the synchronization target moving image data; and outputting the synchronization target moving image data synchronized with the reference moving image data.

* * * * *